United States Patent
Liberg et al.

(10) Patent No.: US 12,015,958 B2
(45) Date of Patent: Jun. 18, 2024

(54) UE, NETWORK NODE AND METHOD FOR ENABLING GNSS MEASUREMENTS

(71) Applicant: Telefonaktiebolaget LM Ericsson (publ), Stockholm (SE)

(72) Inventors: Olof Liberg, Stockholm (SE); Henrik Rydén, Solna (SE); Jonas Sedin, Sollentuna (SE); Sebastian Euler, Storvreta (SE); Xingqin Lin, San Jose, CA (US)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 393 days.

(21) Appl. No.: 17/423,997

(22) PCT Filed: Dec. 23, 2019

(86) PCT No.: PCT/SE2019/051345
§ 371 (c)(1),
(2) Date: Jul. 19, 2021

(87) PCT Pub. No.: WO2020/162806
PCT Pub. Date: Aug. 13, 2020

(65) Prior Publication Data
US 2022/0104084 A1  Mar. 31, 2022

Related U.S. Application Data

(60) Provisional application No. 62/802,221, filed on Feb. 7, 2019.

(51) Int. Cl.
*H04W 36/00* (2009.01)
*H04W 36/32* (2009.01)
(Continued)

(52) U.S. Cl.
CPC ..... *H04W 36/00837* (2018.08); *H04W 36/32* (2013.01); *H04W 60/04* (2013.01); *H04W 76/28* (2018.02); *H04W 84/06* (2013.01)

(58) Field of Classification Search
None
See application file for complete search history.

(56) References Cited

U.S. PATENT DOCUMENTS 10,322,695 B1 * 6/2019 Veloso .................. B60R 25/102
10,728,951 B2 * 7/2020 Martin ............. H04W 52/0216
(Continued)

OTHER PUBLICATIONS

International Search Report and Written Opinion dated Sep. 10, 2020 for International Application No. PCT/SE2019/051345 filed Dec. 23, 2019, consisting of 20-pages.
(Continued)

*Primary Examiner* — Chandrahas B Patel
(74) *Attorney, Agent, or Firm* — Weisberg I.P. Law, P.A.

(57) ABSTRACT

The present disclosure relates to a method performed by a UE for enabling GNSS measurements. The UE and a network node are included in a NR communications network, and the NR communications network includes a NTN component. The UE performs a GNSS measurement according to a rule and using a GNSS receiver included in the UE. At least one of a UE position and an absolute time is an output of the GNSS measurement or is derivable from the GNSS measurement.

9 Claims, 10 Drawing Sheets

(51) Int. Cl.
*H04W 60/04* (2009.01)
*H04W 76/28* (2018.01)
*H04W 84/06* (2009.01)

(56) References Cited

U.S. PATENT DOCUMENTS

| | | |
|---|---|---|
| 11,259,264 B2 * | 2/2022 | Nagasawa ............ H04W 60/04 |
| 2012/0039365 A1 | 2/2012 | Suzuki et al. |
| 2016/0142961 A1 | 5/2016 | Schmidt et al. |
| 2020/0351723 A1 * | 11/2020 | Kim ..................... H04W 36/08 |

OTHER PUBLICATIONS

3GPP TR 38.811 V15.0.0; 3rd Generation Partnership Project; Technical Specification Group Radio Access Network; Study on New Radio (NR) to support non terrestrial networks (Release 15), Jun. 2018, consisting of 118-pages.

3GPP TR 38.811 V15.4.0; 3rd Generation Partnership Project; Technical Specification Group Radio Access Network; Study on New Radio (NR) to support non terrestrial networks (Release 15), Sep. 2020, consisting of 127-pages.

3GPP TSG RAN1 Meeting #92 R1-1803507; Title: NR-NTN: Paging in NGSO Satellite Systems; Agenda Item: 7.3.2; Source: Hughes; Release: Rel-15; Specification: 38.811 (SID=sFS_NR_nonterr_nw); Document for: Discussion; Date and Location: Feb. 26-Mar. 2, 2018, Athens, Greece, consisting of 8-pages.

* cited by examiner

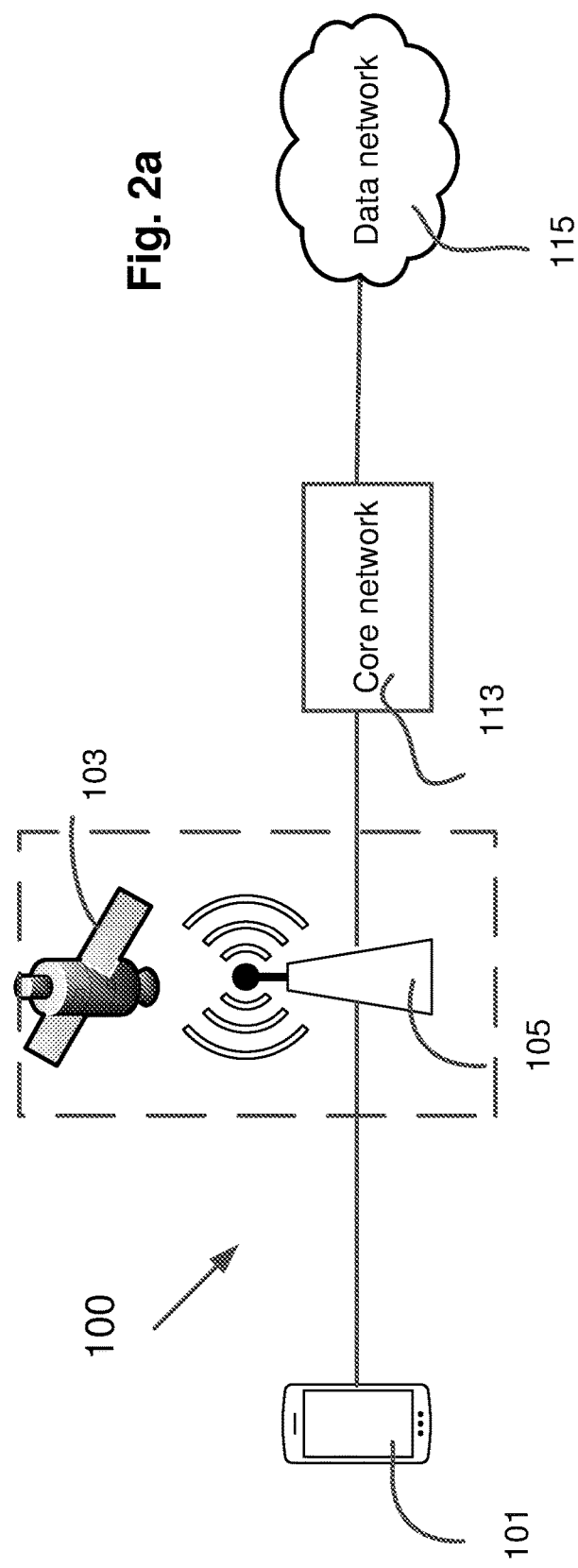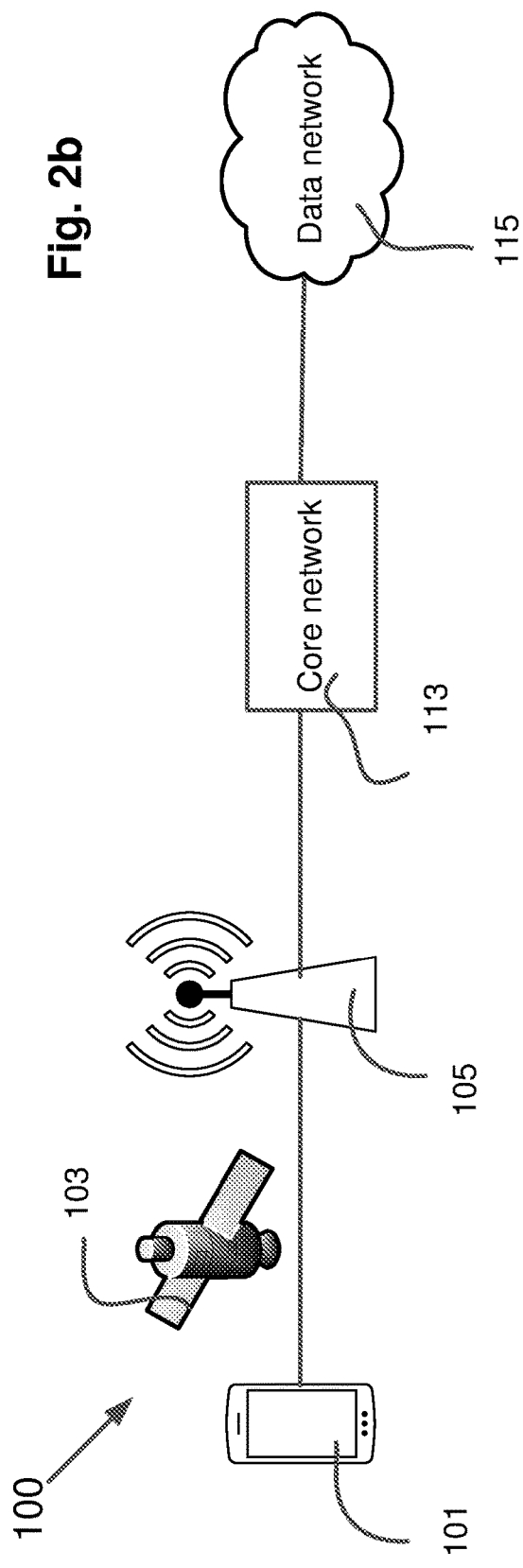

UE, NETWORK NODE AND METHOD FOR ENABLING GNSS MEASUREMENTS

CROSS-REFERENCE TO RELATED APPLICATIONS

This application is a Submission Under 35 U.S.C. § 371 for U.S. National Stage Patent Application of International Application No.: PCT/SE2019/051345, filed Dec. 23, 2019 entitled "UE, NETWORK NODE AND METHOD FOR ENABLING GNSS MEASUREMENTS," which claims priority to U.S. Provisional Application No. 62/802,221, filed Feb. 7, 2019, the entireties of both of which are incorporated herein by reference.

TECHNICAL FIELD

The present disclosure relate generally to a User Equipment (UE), a method performed by the UE, a network node and a method performed by the network node. More particularly the present disclosure relate to enabling Global Navigation Satellite System (GNSS) measurements.

BACKGROUND

In Third Generation Partnership Project (3GPP) Release 15, the first release of the Fifth Generation (5G) was developed. This is the next generation radio access technology which is intended to serve use cases such as enhanced Mobile Broadband (eMBB), Ultra-Reliable and Low Latency communication (URLLC) and massive Machine Type Communications (mMTC).

5G can be based on the New Radio (NR) access stratum interface and the 5G Core Network (5GC). The NR physical and higher layers are reusing parts of the Long Term Evolution (LTE) 3GPP specification, and to that add needed components to e.g. support operation in a set of new frequency bands in the range 24.25 to 52.6 Giga Hertz (GHz).

Non-Terrestrial Network (NTN)

In Release 15, 3GPP started the work to prepare NR for operation in a Non-Terrestrial Network (NTN). The work was performed within the study item "NR to support Non-Terrestrial Networks" and resulted in TR 38.811. In Release 16, the work to prepare NR for operation in a NTN network continues with the study item "Solutions for NR to support Non-Terrestrial Network".

A satellite radio access network, also referred to as a NTN network, may comprise the following components:
- A satellite that refers to a space-borne platform.
- An earth-based gateway that connects the satellite to a base station or a core network, depending on the choice of architecture.
- Feeder link that refers to the link between a gateway and a satellite
- Service link that refers to the link between a satellite and a UE.

NTN is defined in 3GPP TR 38.811 V15.0.0 (2018 June) as "Networks, or segments of networks, using an airborne or space-borne vehicle to embark a transmission equipment relay node or base station". It also defines a satellite as "a space-borne vehicle embarking a bent pipe payload or a regenerative payload telecommunication transmitter, placed into Low-Earth Orbit (LEO) typically at an altitude between 500 km to 2000 km, Medium-Earth Orbit (MEO) typically at an altitude between 8000 to 20000 km, or Geostationary-satellite Earth Orbit (GEO) at 35 786 km altitude".

Two popular architectures are the Bent pipe transponder and the Regenerative transponder architectures. In the first case, the base station is located on earth behind the gateway, and the satellite operates as a repeater forwarding the feeder link signal to the service link, and vice versa. In the second case, the satellite is in the base station and the service link connects it to the earth-based core network. The base station may be referred to as a network node.

FIG. 1 shows a satellite network with bent pipe transponders. FIG. 1 shows a UE 101. The UE 101 is adapted to communicate with a satellite 103. The satellite 103 may be referred to as an aerial, a NTN component, a NTN unit, a NTN node etc. The satellite 103 is adapted to communicate with a gateway 106 located on ground. A base station 105 is shown to be located on ground. The gateway 106 and the base station 105 are adapted to communicate with each other. The gateway 106 and the base station 105 may be located on the same geographical location or in different geographical locations. The gateway 106 and the base station 105 may be separate units, or they may be co-located. The communication link between the satellite 103 and the gateway 106 may be referred to as a feeder link 108, and may be a one way or two way communication link. The communication link between the satellite 103 and the UE 101 may be referred to as an access link 110, and may be a one way or two way communication link. A spotbeam 111 is shown in FIG. 1 and will be described in more detail below.

Depending on the orbit altitude, a satellite may be categorized as Low Earth orbit (LEO), Medium Earth orbit (MEO), or Geostationary (GEO) satellite.
- LEO: typical heights ranging from 250-1,500 km, with orbital periods ranging from 90-130 minutes.
- MEO: typical heights ranging from 5,000-25,000 km, with orbital periods ranging from 2-14 hours.
- GEO: height at about 35,786 km, with an orbital period of 24 hours.

Propagation Delay

The propagation delay is a main physical phenomenon in a satellite communication system that makes the design different from that of a terrestrial mobile system. For a bent pipe satellite network, the round-trip delay may, due to the orbit height, range from tens of ms in the case of LEO to several hundreds of ms for GEO. This can be compared to the round-trip delays catered for in a cellular network which are limited to 1 ms.

To handle the large Round-Trip delay Time (RTT) in a NR based NTN an interesting technique is to equip each UE 101 with a GNSS receiver. The GNSS receiver allows a UE 101 to estimate its position and the time, e.g. Universal Time Coordinated (UTC). UTC is the standard time common to every place in the world. For example, in a bent pipe satellite network, the time (e.g. UTC) at the gateway can be broadcasted by the NTN satellites. This time signal is received at the UE 101 delayed by the one-way propagation delay from the gateway via the satellite to the UE 101. By comparing this time signal with the time obtained from the GNSS, the UE 101 can calculate a time-offset between the two that will reflect the round-trip time. A NR NTN may overcome the round-trip time by requiring a UE to apply this time-offset as a pre-compensation to its initial Physical Random Access Channel (PRACH) transmission.

RTT is defined by 3GPP TR 38.811 V15.0.0 (2018 June) as the "time required for a network communication to travel from a terminal to the gateway or from the gateway to the terminal and back. This is especially used for web based applications".

A GNSS is a term used for referring to satellite based navigation and positioning system. There are several examples of such GNSS', for example Global Positioning System (GPS), Globalnaya Navigatsionnaya Sputnikovaya Sistema (GLONASS), Galileo, BeiDou etc.

The UE 101 may be pre-loaded (and updated when necessary) with ephemeris of the satellite constellation which can be theoretical or actual, and feeder link data. The GNSS equipped UE 101 can determine its position and the universal time, and compute the position and motion of the possible serving satellites to determine the propagation delay, and delay variation, Doppler shift and variation rate, etc. In addition to position and time, the velocity of the device can be obtained by measuring the Doppler shift of the GNSS signal, or by measuring the variation of the position over an extended period of time.

Spotbeam

A communication satellite typically generates several beams over a given area. The footprint of a beam is usually in an elliptic shape, which has been traditionally considered as a cell. The footprint of a beam is often referred to as a spotbeam. An example of the spotbeam is shown in FIG. 1 with reference number 111. The footprint of a beam may move over the earth surface with the satellite movement or may be earth fixed with some beam pointing mechanism used by the satellite to compensate for its motion. The size of a spotbeam depends on the system design, which may range from tens of kilometers to a few thousands of kilometers.

The NTN beam may, in comparison to the beams observed in a terrestrial network, be very wide and cover an area outside of the area defined by the served cell. Beam covering adjacent cells will overlap and make idle and connected mode mobility based on received signal strength, e.g. Reference Signal Received Power (RSRP), measurements challenging.

GNSS Receiver

A GNSS receiver determines the travel time of a signal from a satellite by comparing the "pseudo random code" it is generating, with an identical code in the signal from the satellite. The receiver "slides" its code later and later in time until it syncs up with the satellite's code. The amount it must slide the code is equal to the signal's travel time. The code measurements are precise to a meter level accuracy. The GNSS receiver may be a GPS receiver, a GLONASS receiver, a Galileo receiver, a BeiDou receiver etc. When the term GNSS receiver is used herein, it refers to any of a GPS receiver, a GLONASS receiver, a Galileo receiver, a BeiDou receiver or any other suitable GNSS receiver. The carrier phase measurement is a measure of the range between a satellite and receiver expressed in units of cycles of the carrier frequency. This measurement can be made with very high precision, e.g. of the order of millimeters, but the whole number of cycles between satellite and GNSS receiver is not measurable. Therefore, the UE 101 needs assistance information from a reference ground station with known location in the vicinity of the UE 101, combining information from a reference ground station and carrier phase measurements can improve the GNSS location to centimeter accuracy.

Sensor Information

Most of the UEs 101 in the market today are equipped with sensors such as an Inertial Measurement Unit (IMU). The IMU may comprise for example a 3-axis gyroscope and a 3-axis accelerometer. The use of IMU can increase the positioning performance, however, a positioning system solely based on IMU is a relative positioning system, i.e., it can estimate the position of a UE 101 relative to a known coordinate. For example, the pressure difference over a period translates to an altitude change, and acceleration during a period indicates a change of speed. Only capable UEs 101 can translate sensor data to a relative displacement, while other UEs 101 are only capable of measuring the raw sensor data.

Location Based Mobility

UEs 101 equipped with GNSS receivers may base its mobility on its geographical position instead of on RSRP measurements. The mobility may be based on its geographical position relative to a set of well-defined geographical positions corresponding to the cell centers in the NTN.

Support for GNSS UE measurements has been identified as a promising technique for supporting Physical Random Access Channel (PRACH) based cell access, and for supporting idle mode mobility. These are two instrumental functions in a cellular network that needs to be based on well specified measurement methods and rules. The required methods for performing GNSS measurements in a NR network are currently missing.

Therefore, there is a need to at least mitigate or solve this issue.

SUMMARY

An objective is therefore to obviate at least one of the above disadvantages and to enable GNSS measurements.

According to a first aspect, the object is achieved by a method performed by a UE for enabling GNSS measurements. The UE and a network node are comprised in a NR communications network, and the NR communications network comprises a NTN component. The UE performs a GNSS measurement according to a rule and using a GNSS receiver comprised in the UE. At least one of a UE position and an absolute time is an output of the GNSS measurement, or is derivable from the GNSS measurement.

According to a second aspect, the object is achieved by a method performed by a network node for enabling GNSS, measurements. The network node and the UE are comprised in a NR communications network. The NR communications network comprises a NTN component. The network node provides a rule to the UE according to which the UE shall perform a GNSS measurement.

According to a third aspect, the object is achieved by a UE for enabling GNSS measurements. The UE and a network node are comprised in a NR communications network. The NR communications network comprises a NTN component. The UE is adapted to perform a GNSS measurement according to a rule and using a GNSS receiver comprised in the UE. At least one of a UE position and an absolute time is an output of the GNSS measurement, or is derivable from the GNSS measurement According to a fourth aspect, the object is achieved by a network node for enabling GNSS measurements. The network node and the UE are comprised in a NR communications network. The NR communications network comprises a NTN component. The network node is adapted to provide a rule to the UE according to which the UE shall perform a GNSS measurement.

The present disclosure affords many advantages, of which a non-exhaustive list of examples follows:

One advantage is that GNSS based measurements methods and rules for operating NR in a NTN are defined.

Another advantage is that improved positioning measurements, e.g. improved accuracy, is provided.

A further advantage is that an improved communications system which operates NR in a NTN is provided.

The embodiments herein are not limited to the features and advantages mentioned above. A person skilled in the art will recognize additional features and advantages upon reading the following detailed description.

BRIEF DESCRIPTION OF THE DRAWINGS

The present disclosure will now be further described in more detail by way of example only in the following detailed description by reference to the appended drawings and in which:

FIG. 2a is a schematic block diagram illustrating a satellite network with regenerative transponders.

FIG. 2b is a schematic block diagram illustrating a satellite network with bent pipe transponders.

Figure 1:
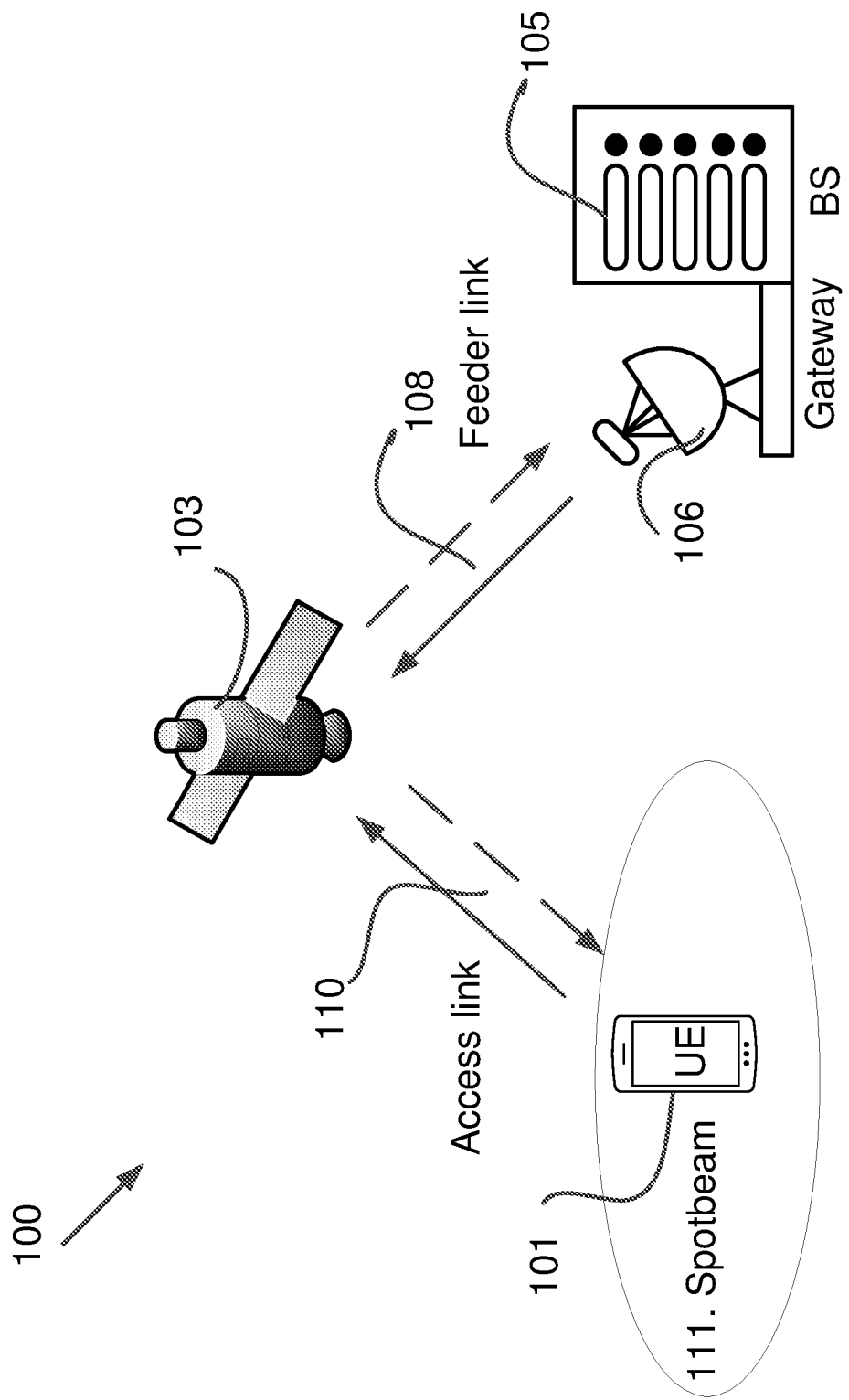
FIG. 1 is a schematic block diagram illustrating a satellite network with bent pipe transponders.

The drawings are not necessarily to scale and the dimensions of certain features may have been exaggerated for the sake of clarity. Emphasis is instead placed upon illustrating the principle.

DETAILED DESCRIPTION

FIG. 2a and FIG. 2b depicts non-limiting examples of a communications system 100. FIG. 2a illustrates a communications system 100 with a regenerative transponder architecture and FIG. 2b illustrates a communications system 100 with a bent pipe transponder architecture. Recall from above that a regenerative transponder architecture is where the satellite 103 is in the network node 105 and the service link connects it to the earth-based core network, and that a bent pipe transponder architecture is where the network node 105 is located on earth behind the gateway 106, and the satellite 103 operates as a repeater forwarding the feeder link 108 signal to the service link, and vice versa. Both these architectures are applicable.

The communications system 100 in FIGS. 2a and 2b may be a wireless communications system, sometimes referred to as a wireless communications network, cellular radio system, or cellular network, a NTN system, a system applying NTN. The communications system 100 may be a Fourth Generation (4G) system, a LTE system, a 5G system, 5G network, a NR system, NR-U or Next Gen system or network. The communications system 100 may alternatively be a younger system than a 5G system. The communications system 100 may support other technologies such as, for example, (LTE, LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, NB-IoT. Thus, although terminology from 5G/NR and LTE may be used in this disclosure, this should not be seen as limiting to only the aforementioned systems.

Note that the reference number 105 will be used herein when referring to a network node or a base station. The network node may be a base station, an eNB, a gNB or any other suitable network node. The network node 105 may be a radio network node, such as a radio base station, or any other network node with similar features capable of serving a UE 101, such as a wireless device or a machine type communication device, in the communications system 100. The network node 105 may be of different classes, such as, e.g., macro base station (BS), home BS or pico BS, based on transmission power and thereby also cell size. The network node 105 may be directly connected to one or more core networks. The network node 105 may be a distributed node, such as a virtual node in the cloud, and it may perform its functions entirely on the cloud, or partially, in collaboration with another network node.

The UE 101 may be referred to as a device or a NTN terminal. A NTN terminal may is defined by 3GPP TR 38.811 V15.0.0 (2018 June) as "It may refer to directly the 3GPP UE or a terminal specific to the satellite system in case the satellite doesn't serve directly 3GPP UEs." FIGS. 2a and 2b shows only one UE 101, but the communications system 100 may comprise any n number of UEs 101, where n is a positive integer. A UE 101 may be referred to simply as a device. The UE 101, e.g. a LTE UE or a 5G/NR UE, may be a wireless communication device which may be known as e.g., a wireless device, a mobile terminal, wireless terminal and/or mobile station, a mobile telephone, cellular telephone, or laptop with wireless capability, just to mention some examples. The UE 101 may be a device by which a subscriber may access services offered by an operator's network and services outside operator's network to which the operator's radio access network and core network provide access, e.g. access to the Internet. The UE 101 may be any device, mobile or stationary, enabled to communicate over a radio channel in the communications network, for instance but not limited to e.g. user equipment, mobile phone, smart phone, sensors, meters, vehicles, household appliances, medical appliances, media players, cameras, Machine to Machine (M2M) device, Internet of Things (IOT) device, terminal device, communication device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the radio access network, with another entity, such as another UE, a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system.

The UE 101 is enabled to communicate wirelessly within the communications system 101. The communication may be performed e.g. between two devices, between a devices and a regular telephone, between the UE 101 and a network node, between network nodes, and/or between the devices and a server via the radio access network and possibly one or more core networks and possibly the internet.

FIG. 2a shows a UE 101 adapted to be connected to a network node 105. The network node 105 and the satellite 103 are co-located, i.e. the network node 105 is comprised in the satellite 103, as indicated with the dotted box around the network node 105 and the satellite 103. The satellite 103 may be referred to as a NTN component, NTN unit or NTN node. Thus, the satellite 103 and the network node 105 are located some distance above the earth. FIG. 2a shows a core network 113 adapted to be connected to at least one of the network node 105 and/or a data network 115. The core network 113 may be based on LTE, NR or any other suitable communication technology. In FIG. 2a, the satellite 103 or the aerial comprises full or part of a network node 105 to generate/receive a "Satellite friendly" NR signal to/from the UEs 101. This requires sufficient on board processing capabilities to be able to deploy network node or Relay Node functions.

FIG. 2b shows a UE 101 adapted to be connected to a network node 105. The network node 105 is located on ground and the satellite 103 is located "in the air", i.e. the network node 105 and the satellite 103 are located separately. The satellite 103 may be seen as being located between the UE 101 and the network node 105. The satellite 103 may be referred to as a NTN component, NTN unit or NTN node. FIG. 2b shows a core network 113 adapted to be connected to at least one of the network node 105 and/or a data network 115. The core network 113 may be based on LTE, NR or any other suitable communication technology. In FIG. 2a, the satellite 103 or the aerial will relay a "Satellite friendly" NR signal between the network node 105 and the UEs 101 in a transparent manner.

The communication system 100 in FIGS. 2 and 2b may comprise a gateway 106 (not shown in FIG. 2a or 2b, but shown in FIG. 1). According to 3GPP TR 38.811 V15.0.0 (2018 June) the gateway 106 are "Gateways that connect the satellite or aerial access network to the core network".

It should be noted that the communication links in the communications network may be of any suitable kind comprising either a wired or wireless link. The link may use any suitable protocol depending on type and level of layer (e.g. as indicated by the Open Systems Interconnection (OSI) model) as understood by the person skilled in the art.

Figure 3:
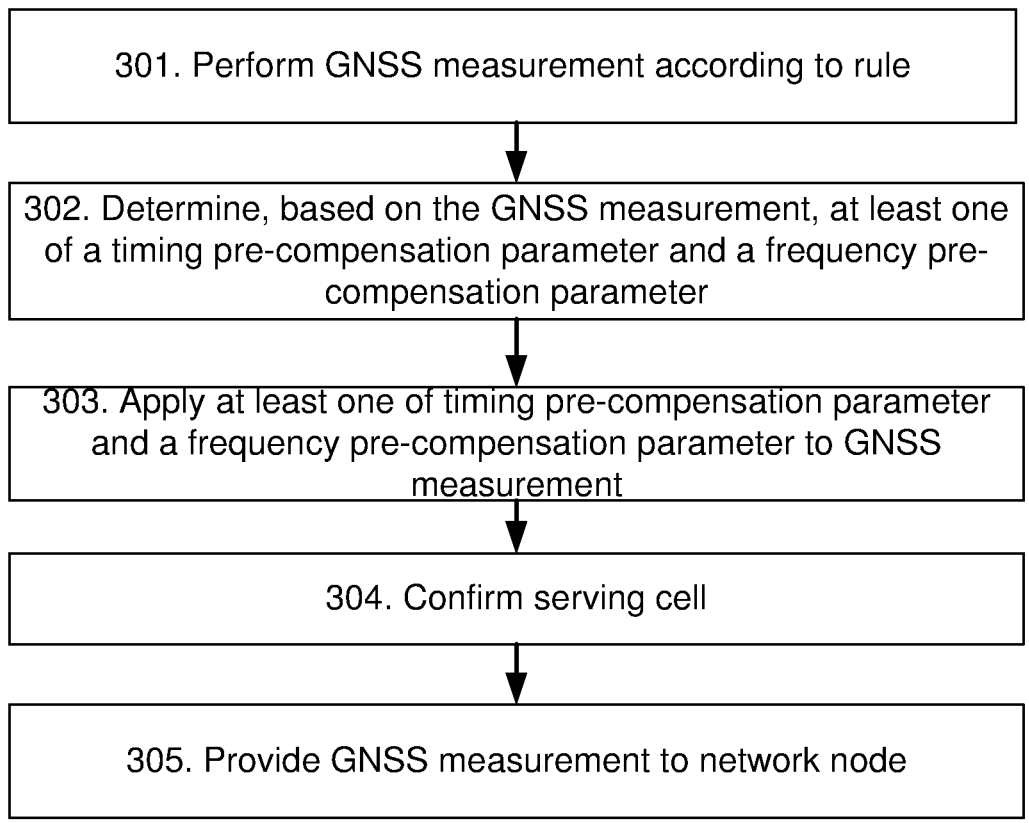
FIG. 3 is a flow chart illustrating a method.

FIG. 3 is a flowchart describing the present method in the UE 101 enabling GNSS measurements. The UE 101 and a network node 105 are comprised in a NR communications network, and the NR communications network comprises a NTN component 103. The method comprises at least one of the following steps to be performed by the UE 101, which steps may be performed in any suitable order than described below:

Step 301

The UE 101 performs a GNSS measurement according to a rule. The GNSS measurement is performed using a GNSS receiver comprised in the UE 101. At least one of an UE position and an absolute time may be the output of the GNSS measurement, or at least one of the UE position and the absolute time may be derivable from the GNSS measurement. The position may be referred to as a geographical position, i.e. a position on earth. The geographical position may be represented by coordinates in any suitable coordinate system. Absolute time may be referred to as UTC.

The rule may be referred to as an indication, a criteria, a parameter. There may be one or multiple rules, where multiple refers to n number where n is a positive integer larger than one.

The rule may be provided from the network node 105, or it may be pre-configured in the UE 101 or it may be obtained by the UE 101 in some other way. The rule may be referred to as a measurement rule.

The rule may be provided from the network node 105, pre-configured in the UE 101 or obtained by the UE 101 in some other way.

The rule may be that the GNSS measurement is performed with a periodicity when the UE 101 is in idle mode.

The rule may be that the GNSS measurement is performed with a periodicity in the format hh:mm:ss when the UE is in idle mode, where hh is a number of hours, mm is a number of minutes and ss is a number of seconds.

The UE 101 may be in idle mode, then the rule may be that the GNSS measurement may be performed with a periodicity associated with at least one of:
  Time format, e.g. hh:mm:ss.
  a Discontinuous Reception (DRX) cycle;
  an enhanced Discontinuous Reception (eDRX) cycle; and/or
  a Tracking Area Update (TAU) timer; and/or
  a Radio Access Network based Notification Area Update (RNAU) timer.

The rule may be that the GNSS measurement may be performed when the UE 101 has moved more than a distance L when the UE 101 is in idle mode.

The UE 101 may be in idle mode, and then the UE 101 may:
  obtain, e.g. from the network node 105, information indicating geographical cell boundaries defining the NR communications system 100;
  determining the UE's distance d to an edge of the currently camped on cell;
  determining, based on the distance d and the UE's velocity v, a time t until a next occasion for performing the GNSS measurement: and
  then the rule may that the GNSS measurement is performed at the determined time.

The UE's velocity v may be a maximum expected velocity, or the UE's velocity may be obtained from the GNSS measurement or obtained from sensor measurements by the UE 101.

The rule may be that the GNSS measurement is performed when triggered by an event.

When the UE 101 is in idle mode, then the event may be that a UE 101 selects a new cell that does not belong to at least one tracking area to which the UE 101 is registered.

When the UE 101 is in inactive mode or inactive state, then the event may be that the UE 101 selects a new cell that does not belong to the configured RAN-based Notification Area (RNA).

When the UE 101 is in connected mode, then the event may be at least one of:
  receipt of a handover command from the network node 105; and/or that a conditional handover triggering condition is fulfilled; and/or that a beam failure recovery procedure is triggered; and/or that a new cell that does not belong to any of the current timing advance groups is activated.

When the UE 101 is in connected mode, then the UE 101 may:

obtain, e.g. from the network node 105, a timer;

restart the timer when a timing advance update command and/or a frequency adjustment command is received from the network node 105; and then the rule may be that the GNSS measurement is performed if the UE 101 does not receive another timing advance update command and/or frequency adjustment update command before the timer expires.

The UE 101 may be in idle mode or in connected mode.

The GNSS receiver may be referred to as a GNSS device, a GNSS transceiver and I a device which is adapted to perform GNSS measurements, i.e. to receive GNSS signals or data from the NTN component 103.

Step 302

The UE 101 may determine, based on the GNSS measurement, at least one of a timing pre-compensation parameter and a frequency pre-compensation parameter.

Information associated with the event may be used when determining the at least one of the timing pre-compensation parameter and the frequency pre-compensation parameter.

The UE 101 may obtain, e.g. from the network node, instructions to perform the GNSS measurement, and the instructions may be used when determining the at least one of the timing pre-compensation and the frequency pre-compensation.

The instructions may be obtained when a previous GNSS measurement reported by the UE 101 to the network node 105 is older than a timing threshold. When the previous GNSS measurement reported is older than the timing threshold, the previous GNSS measurement reported is associated with a previous GNSS measurement performed at a time which is previous to the timing threshold, at a time which is smaller or lower than the timing threshold.

Step 303

The UE 101 may apply the timing pre-compensation parameter and/or a frequency pre-compensation parameter to the GNSS measurement. The result of the applying of the timing pre-compensation parameter and/or a frequency pre-compensation parameter to the GNSS measurement may be referred to as a pre-compensated GNSS measurement.

Step 304

The UE 101 may confirm its current serving cell based on the GNSS measurement. The UE 101 may provide the confirmation to the network node 105. The UE 101 may perform the confirmation by comparing the UE position comprised in or derivable from the GNSS measurement with another position known by the UE 101 not derived from any GNSS measurement.

Step 305

The UE 101 may provide information indicating the GNSS measurement to the network node 105. The information may be provided by directly transmitting it to the network node 105, but transmitting it to the network node 105 via some other node, by transmitting it to another node for storing and from which the network node 105 may obtain the information when needed etc.

The information indicating the GNSS measurement may be the actual GNSS measurement or it may be the GNSS measurement with the applied at least one of the timing pre-compensation parameter and the frequency pre-compensation parameter, i.e. the pre-compensated GNSS measurement.

The UE 101 may re-attempt to perform the GNSS measurement after a time interval if the UE 101 was not able to perform the GNSS measurement.

If N consecutive GNSS measurements have failed, then the UE 101 may perform measurements without GNSS assistance, where N is a positive integer and where N is hardcoded or configured by the network node 105.

Figure 4:
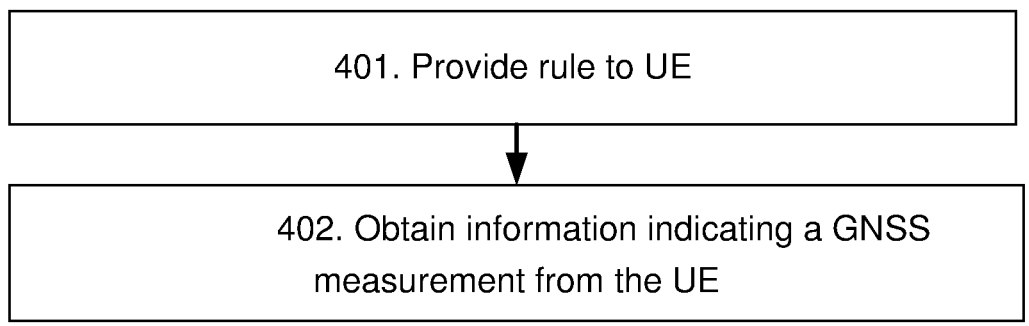
FIG. 4 is a flow chart illustrating a method.

FIG. 4 is a flowchart describing the present method in the network node 105 enabling GNSS measurements. The UE 101 and the network node 105 are comprised in a NR communications network, and the NR communications network comprises a NTN component 103. The method comprises at least one of the following steps to be performed by the network node 105, which steps may be performed in any suitable order than described below:

Step 401

The network node 105 may provide a rule, e.g. information indicating the rule, to the UE 101 according to which the UE 101 shall perform a GNSS measurement.

Step 402

The network node 105 may obtain information indicating the GNSS measurement from the UE 101.

The network node 105 may provide, to the UE 101, information indicating geographical cell boundaries defining the NR communications system 100.

The network node 105 may provide a receipt of a handover command to the UE 101.

The network node 105 may provide, to the UE 101, instructions to perform the GNSS measurement.

The network node 105 may provide a timer to the UE 101.

Radio Resource Control (RRC)

RRC is a protocol used in a communications system 100. RRC is a layer between the UE 101 and the network node 105. The RRC protocol defines different modes that the UE 101 can be in, such as idle or connected. In idle mode, the UE 101 has no connection. In connected mode, the UE 101 has a connection. The idle mode may be referred to as RC_idle and the connected mode may be referred to as RRC_connected.

GNSS measurements for UE in RRC_IDLE

The UE 101 may perform GNSS measurements for obtaining its geographical position and/or a clock signal. A GNSS measurement may comprise one or multiple parameters of different formats. The GNSS measurement may be described as comprising data. The data may comprise the UEs 101 geographical position and/or a clock signal, in addition to other suitable parameters. At least one of the geographical position and the clock signal may be directly comprised in the GNSS measurement or they may be derivable from the GNSS measurement.

Idle Mode Mobility

The UE 101 may perform GNSS measurements according to a configured measurement periodicity. Performing GNSS measurements may be described as the UE 101 measures its geographical position. The GNSS measurements frequency may be configured in the format hh:mm:ss where hh is the number of hours, mm is the number of minutes, and ss is the number of seconds that defines the measurement periodicity.

The GNSS measurements periodicity may be coupled to the configured DRX cycle, eDRX cycle or the TAU timer or RAN-based Notification Area Update (RNAU) timer. A UE 101 may e.g. be required to verify its geographical location N times evenly distributed across the DRX cycle, eDRX cycle, or the TAU timer.

The GNSS measurement estimate is not periodically updated, but instead updated when a UE 101 capable of estimating relative displacement has estimated that it has moved more than a distance L.

The network node 101 may inform the UE 101 about the geographical cell boundaries defining the communications system 100, e.g. a cellular network. The UE 101 may determine its distance d to the edge of the currently camped on cell and may determine the time t until the next GNSS measurement occasion based on the distance d and its velocity v. In a non-limiting example t=d/v. The velocity v may e.g. be defined by the maximum expected velocity by the UE 101, or may be obtained from the GNSS measurement, or the velocity v may be determined by sensor measurements at the UE 101.

The UE's GNSS measurements may be event triggered. For a UE 101 in RRC_IDLE, if the UE 101 selects a new cell that does not belong to at least one tracking area to which the UE 101 is registered, the UE 101 may measure its geographical position and reports it to the network node 105 in the location registration procedure. For a UE 101 in RRC_INACTIVE, if the UE 101 selects a new cell that does not belong to the configured RNA, the UE 101 measures its geographical position and reports it to the network node 105 in the RNA update procedure.

"Measuring its geographical position" may be the same as performing a GNSS measurement, measuring GNSS data, obtaining GNSS data, determining GNSS data, determining a geographical position etc.

Mobile Terminated System (MT) Access

A UE 101 may, immediately before its paging occasion, be required to determine its geographical location, and the absolute time of day, by means of a GNSS measurement. The UE 101 may use this information to confirm its serving cell and to compute the timing pre-compensation and/or frequency pre-compensation required to be applied in the PRACH transmission which is triggered in case the UE 101 is paged.

Mobile Originated System (MO) Access

A UE 101 may be, immediately before performing a MO random access, required to determine its geographical location, and the absolute time of day, by means of a GNSS measurement. The UE 101 may use this information to confirm its serving cell and to compute the timing pre-compensation and/or frequency pre-compensation required to be applied in the PRACH transmission.

GNSS Measurements for UE in RRC_CONNECTED

The network node 105 may configure a timer for each UE 101, which the UE 101 restarts each time at least one of a timing advance update command and a frequency adjustment command is received. If the UE 101 does not receive another at least one of the timing advance update command and the frequency adjustment update command before the timer expires, the UE 101 is required to determine its geographical location, and the universal time, by means of a GNSS measurement. The UE 101 may use this information to compute at least one of the timing pre-compensation and the frequency pre-compensation required to be applied for maintaining uplink synchronization and is not required to perform random-access procedure. In another option, after pre-compensation, the UE 101 can be configured to be required to transmit a random-access preamble to refine the uplink timing and frequency synchronization procedures with the network node 105.

The network node 105 may issue a command to instruct the UE 101 to perform a GNSS measurement. The UE 101 may use this information to compute at least one of the timing pre-compensation and the frequency pre-compensation required to be applied for maintaining uplink synchronization. After the GNSS measurement, the UE 101 may report the measurement results to the network node 105.

The UE's GNSS measurements may be event triggered. Such events may be one or more of the following.
- A handover command from the network node 105 may trigger the UE 101 to perform a GNSS measurement. The UE 101 may use this information to compute at least one of the timing pre-compensation and the frequency pre-compensation required to be applied for random access towards the target cell.
- When conditional handover triggering condition is satisfied, a GNSS measurement may be triggered to check if the conditional handover should be executed.
- When beam failure recovery procedure is triggered, the UE 101 may perform a GNSS measurement. The UE 101 may use this information to compute at least one of the timing pre-compensation and the frequency pre-compensation required to be applied for transmitting a random-access preamble on PRACH resource configured for beam failure recovery
- In at least one of carrier aggregation and dual connectivity, the UE 101 may perform a GNSS measurement when a new cell that does not belong to any of the current timing advance groups is activated. The UE 101 may use the information from the GNSS measurement to compute at least one of the timing pre-compensation and the frequency pre-compensation required for establishing uplink synchronization with the newly activated cell.

Related to connected mode GNSS measurement, the network node 105 may require that the GNSS measurement reported or otherwise used is not older than a configured timing threshold defining a measurement periodicity, implying that if the measurement is older than the threshold, a new measurement must be made. This threshold may be hard-coded according the UE GNSS measurement class or may be signaled. As an alternative, the GNSS measurement periodicity may be coupled to the configured RRC Connected DRX periodicity.

Behavior in Case GNSS Measurements are not Available

In case a UE 101 is not able to perform a GNSS measurement, it may reattempt to perform a GNSS measurement after a specified or randomly drawn time interval. If N, consecutive measurement attempts fail, the UE 101 should fall back to performing the corresponding procedures without GNSS assistance, e.g. RSRP and/or RSRQ based mobility procedures. N may either be hardcoded or configured by the network node 105 and N may be a positive integer The present disclosure relates to definition of rules for GNSS based geographical measurements. It proposes a set of GNSS measurements methods and rules for the purpose of supporting at least cell access and idle mode mobility.

Figure 5A:
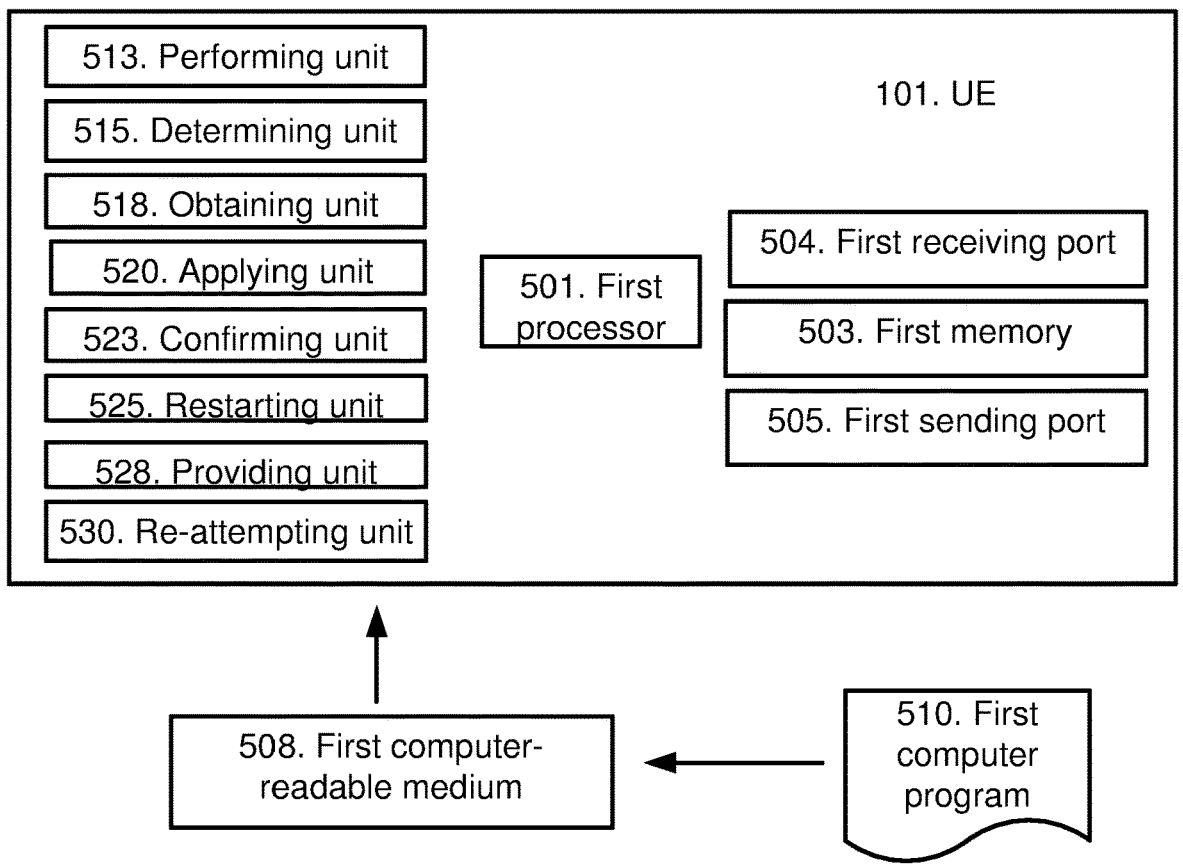
FIG. 5 is a schematic drawing illustrating a UE.
Figure 5B:
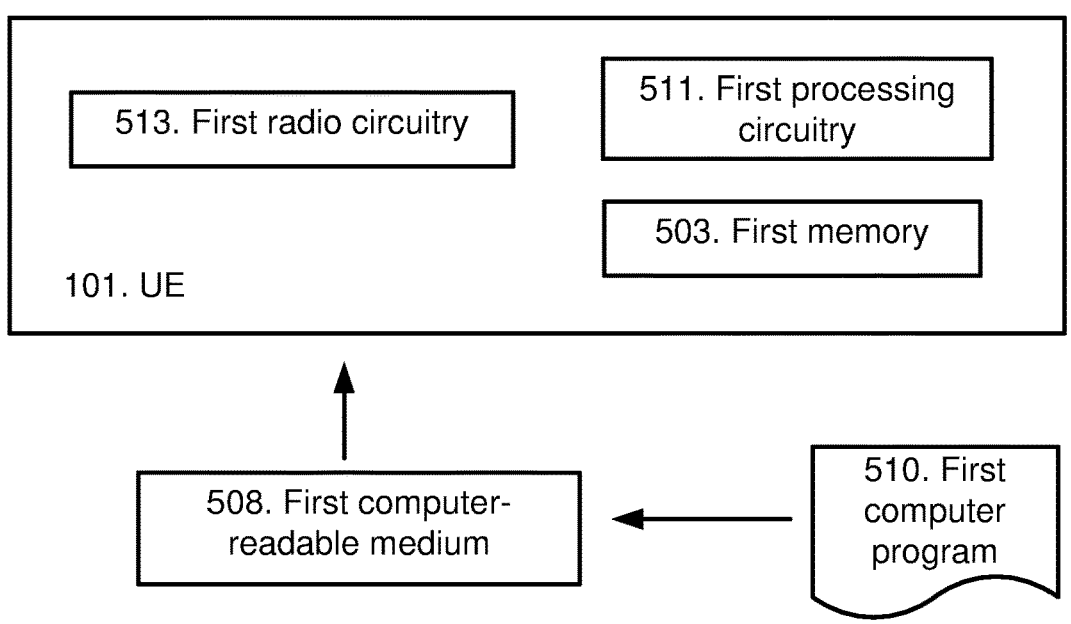

FIG. 5*a* and FIG. 5*b* depict two different examples in panels a) and b), respectively, of the arrangement that the UE 101 may comprise. The UE 101 may comprise the following arrangement depicted in FIG. 5*a*.

The present disclosure in the UE 101 may be implemented through one or more processors, such as a first processor 501 in the UE 101 depicted in FIG. 5*a*, together with computer program code for performing the functions and actions described herein. A processor, as used herein, may be understood to be a hardware component. The program code mentioned above may be provided as a computer program product, for instance in the form of a data carrier carrying computer program code for performing the present disclosure when being loaded into the UE 101. One such carrier may be in the form of a CD ROM disc. It is however feasible with other data carriers such as a memory stick. The computer program code may be provided as pure program code on a server and downloaded to the UE 101.

The UE 101 may comprise a first memory 503 comprising one or more memory units. The memory 503 is arranged to be used to store obtained information, store data, configurations, schedulings, and applications etc. to perform the methods herein when being executed in the UE 101.

The UE 101 may receive information from, e.g., the network node 105, through a first receiving port 504. The first receiving port 504 may be, for example, connected to one or more antennas in UE 101. The UE 101 may receive information from another structure in the communications system 100 through the first receiving port 504. Since the first receiving port 504 may be in communication with the first processor 501, the first receiving port 504 may then send the received information to the first processor 501. The first receiving port 504 may be configured to receive other information.

The first processor 501 in the UE 101 may be configured to transmit or send information to e.g. network node 105, or another structure in the communications system 100, through a first sending port 505, which may be in communication with the first processor 510, and the first memory 503.

The UE 101 may comprise a performing unit 513, a determining unit 515, an obtaining unit 518, an applying unit 520, a confirming unit 523, a restarting unit 525, a providing unit 528 and a re-attempting unit 530.

The performing unit 513 may also be referred to as a performing module, a performing means, a performing circuit, means for performing etc. The performing unit 513 may be the first processor 501 of the UE 101 or comprised in the first processor 501 of the UE 101.

The determining unit 515 may also be referred to as a determining module, a determining means, a determining circuit, means for determining etc. The determining unit 515 may be the first processor 501 of the UE 101 or comprised in the first processor 501 of the UE 101.

The obtaining unit 518 may also be referred to as an obtaining module, an obtaining means, an obtaining circuit, means for obtaining etc. The obtaining unit 518 may be the first processor 501 of the UE 101 or comprised in the first processor 501 of the UE 101.

The applying unit 520 may also be referred to as an applying module, an applying means, an applying circuit, means for applying etc. The applying unit 520 may be the first processor 501 of the UE 101 or comprised in the first processor 501 of the UE 101.

The confirming unit 523 may also be referred to as a confirming module, a confirming means, a confirming circuit, means for confirming etc. The confirming unit 523 may be the first processor 501 of the UE 101 or comprised in the first processor 501 of the UE 101.

The restarting unit 525 may also be referred to as a restarting module, a restarting means, a restarting circuit, means for restarting etc. The restarting unit 525 may be the first processor 501 of the UE 101 or comprised in the first processor 501 of the UE 101.

The providing unit 528 may also be referred to as a providing module, a providing means, a providing circuit, means for providing etc. The providing unit 528 may be the first processor 501 of the UE 101 or comprised in the first processor 501 of the UE 101.

The re-attempting unit 530 may also be referred to as a re-attempting module, a re-attempting means, a re-attempting circuit, means for re-attempting etc. The re-attempting unit 530 may be the first processor 501 of the UE 101 or comprised in the first processor 501 of the UE 101.

The UE 101 may be adapted to, e.g. by means of the performing unit 513, performing a GNSS measurement according to a rule and using a GNSS receiver comprised in the UE 101. At least one of a UE position and an absolute time is an output of the GNSS measurement or is derivable from the GNSS measurement.

The rule may be provided from the network node 105, pre-configured in the UE 101 or obtained by the UE 101.

The rule may be that the GNSS measurement is performed with a periodicity. The rule may be that the GNSS measurement is performed with a periodicity in the format hh:mm:ss. hh is a number of hours, mm is a number of minutes and ss is a number of seconds.

The rule may be that the GNSS measurement is performed with a periodicity associated with at least one of:
a time format, e.g. hh:mm:ss
a DRX, cycle;
a eDRX cycle;
a TAU timer; and
a RNAU timer.

The rule may be that the GNSS measurement is performed when the UE 101 has moved more than a distance L.

The UE 101 may be adapted to, e.g. by means of the obtaining unit 518, obtain, from the network node 105, information indicating geographical cell boundaries defining the NR communications network 100.

The UE 101 may be adapted to, e.g. by means of the determining unit 515, determine the UE's distanced to an edge of the currently camped on cell.

The UE 101 may be adapted to, e.g. by means of the determining unit 515, determine, based on the distance d and the UE's velocity v, a time t until a next occasion for performing the GNSS measurement.

The rule may be that the GNSS measurement is performed at the determined time.

The UE's velocity v may be a maximum expected velocity, or the UE's velocity may be obtained from the GNSS measurement or obtained from sensor measurements by the UE 101.

The rule may be that the GNSS measurement is performed when triggered by an event.

The event may be that the UE 101 selects a new cell that does not belong to at least one tracking area to which the UE 101 is registered.

The event may be that the UE 101 selects a new cell that does not belong to the configured RNA.

The event may be at least one of:
receipt of a handover command from the network node;
that a conditional handover triggering condition is fulfilled;
that a beam failure recovery procedure is triggered; and
that a new cell that does not belong to any of the current timing advance groups is activated.

The UE 101 may be adapted to, e.g. by means of the determining unit 515, determine, based on the GNSS measurement, at least one of a timing pre-compensation parameter and a frequency pre-compensation parameter.

The UE 101 may be adapted to, e.g. by means of the applying unit 520, apply the at least one of the timing pre-compensation parameter and the frequency pre-compensation parameter to the GNSS measurement.

Information associated with the event may be used when determining the at least one of the timing pre-compensation parameter and the frequency pre-compensation parameter.

The UE 101 may be adapted to, e.g. by means of the confirming unit 523, confirm the UE's current serving cell based on the GNSS measurement.

The UE 101 may be adapted to, e.g. by means of the obtaining unit 518, obtain, from the network node, instructions to perform the GNSS measurement. The instructions may be used when determining at least one of the timing pre-compensation and the frequency pre-compensation.

The instructions may be obtained when a previous GNSS measurement reported by the UE 101 to the network node 105 is older than a timing threshold. When the previous GNSS measurement reported is older than the timing threshold, the previous GNSS measurement reported is associated with a previous GNSS measurement performed at a time which is previous to the timing threshold, at a time which is smaller or lower than the timing threshold.

The UE 101 may be adapted to, e.g. by means of the obtaining unit 518, obtain a timer from the network node 105.

The UE 101 may be adapted to, e.g. by means of the restarting unit 525, restart the timer when at least one of a timing advance update command and a frequency adjustment command is received from the network node 105.

The rule may be that the GNSS measurement is performed if the UE 101 does not receive another at least one of the timing advance update command and the frequency adjustment update command before the timer expires.

The UE 101 may be adapted to, e.g. by means of the providing unit 528, provide information indicating the GNSS measurement to the network node 105.

The UE 101 may be adapted to, e.g. by means of the re-attempting unit 530, re-attempt to perform the GNSS measurement after a time interval if the UE 101 was not able to perform the GNSS measurement.

The UE 101 may be adapted to, e.g. by means of the performing unit 513, if N consecutive GNSS measurements have failed, perform measurements without GNSS assistance. N is a positive integer and where N is hardcoded or configured by the network node 105.

The performing unit 513, a determining unit 515, a obtaining unit 518, an applying unit 520, a confirming unit 523, a restarting unit 525, a providing unit 528 and a re-attempting unit 530 described above may refer to a combination of analog and digital circuits, and/or one or more processors configured with software and/or firmware, e.g., stored in memory, that, when executed by the one or more processors such as the first processor 501, perform as described above. One or more of these processors, as well as the other digital hardware, may be comprised in a single Application-Specific Integrated Circuit (ASIC), or several processors and various digital hardware may be distributed among several separate components, whether individually packaged or assembled into a System-on-a-Chip (SoC).

The different units 513-530 described above may be implemented as one or more applications running on one or more processors such as the first processor 501.

Thus, the methods described herein for the UE 101 may be respectively implemented by means of a first computer program 510 product, comprising instructions, i.e. software code portions, which, when executed on at least one first processor 501, cause the at least one first processor 501 to carry out the actions described herein, as performed by the UE 101. The first computer program 510 product may be stored on a first computer-readable storage medium 508. The first computer-readable storage medium 609, having stored thereon the first computer program 510, may comprise instructions which, when executed on at least one first processor 501, cause the at least one first processor 501 to carry out the actions described herein, as performed by the UE 101. The first computer-readable storage medium 508 may be a non-transitory computer-readable storage medium, such as a CD ROM disc, or a memory stick. The first computer program 510 product may be stored on a carrier comprising the first computer program 510 just described. The carrier is one of an electronic signal, optical signal, radio signal, or the first computer-readable storage medium 508, as described above.

The UE 101 may comprise a communication interface configured to facilitate communications between the UE 101 and other nodes or devices, e.g., the network node 105, or another structure. The interface may, for example, comprise a transceiver configured to transmit and receive radio signals over an air interface in accordance with a suitable standard.

The UE 101 may comprise the following arrangement depicted in FIG. 5b. The UE 101 may comprise a first processing circuitry 511, e.g., one or more processors such as the first processor 510, in the UE 101 and the memory 708. The UE 101 may comprise a first radio circuitry 513, which may comprise e.g., the first receiving port 504 and the first sending port 505. The first processing circuitry 511 may be configured to, or operable to, perform the method actions according to FIG. 3-FIG. 4, and/or FIGS. 9-12, in a similar manner as that described in relation to FIG. 5a. The first radio circuitry 513 may be configured to set up and maintain at least a wireless connection with the UE 101. Circuitry may be understood herein as a hardware component.

Hence, the UE 101 is operative to operate in the communications system 100. The UE 101 may comprise the first processing circuitry 511 and the first memory 503. The first memory 503 comprises instructions executable by said first processing circuitry 511. The UE 101 is operative to perform the actions described herein in relation to the UE 101, e.g., in FIGS. 3-4 and/or 9-12.

Figure 6A:
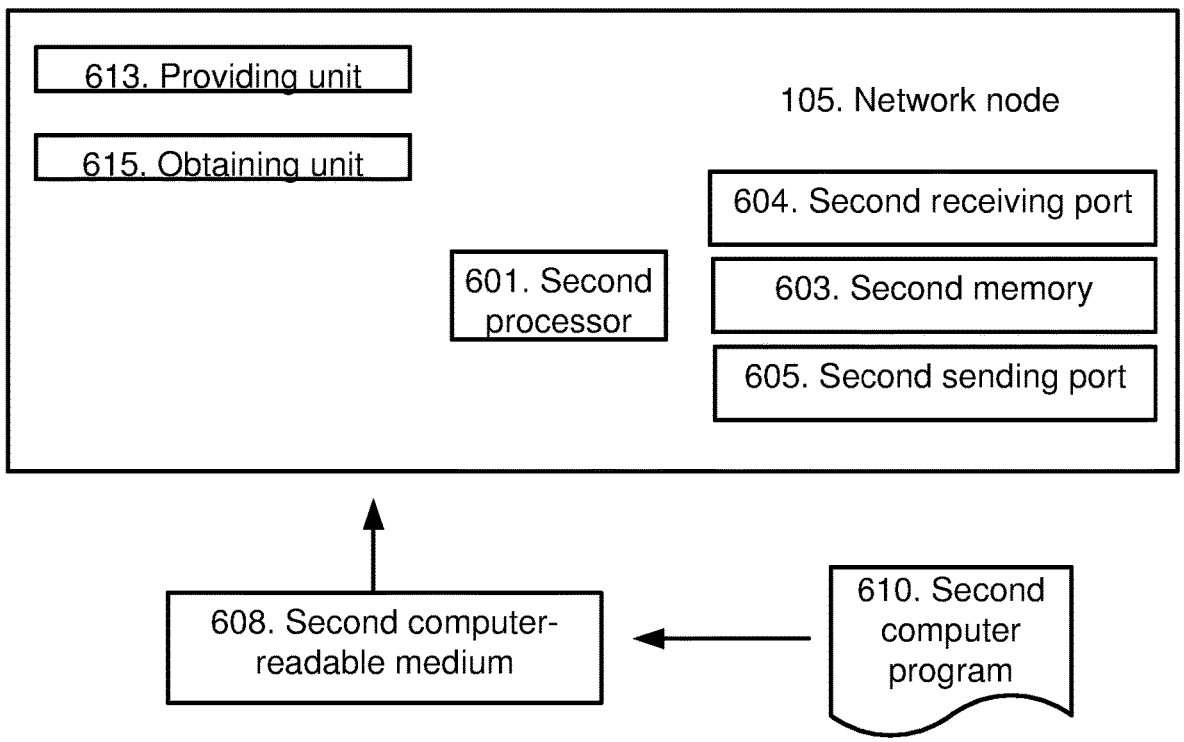
FIG. 6 is a schematic drawing illustrating a network node.
Figure 6B:
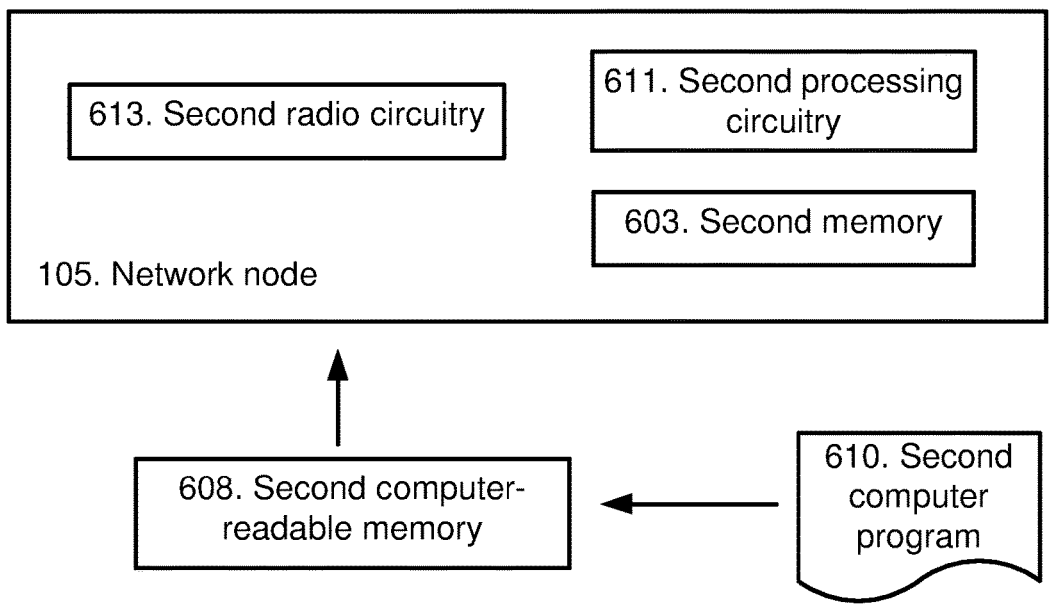

FIG. 6a and FIG. 6b depict two different examples in panels a) and b), respectively, of the arrangement that the network node 105 may comprise. The network node 105 may comprise the following arrangement depicted in FIG. 6a.

The present disclosure in the network node 105 may be implemented through one or more processors, such as a second processor 601 in the network node 105 depicted in FIG. 6a, together with computer program code for performing the functions and actions described herein. A processor, as used herein, may be understood to be a hardware component. The program code mentioned above may be provided as a computer program product, for instance in the form of a data carrier carrying computer program code for performing the present disclosure when being loaded into the network node 105. One such carrier may be in the form of a CD ROM disc. It is however feasible with other data carriers such as a memory stick. The computer program code may be provided as pure program code on a server and downloaded to the network node 105.

The network node 105 may comprise a second memory 603 comprising one or more memory units. The second memory 603 is arranged to be used to store obtained information, store data, configurations, schedulings, and applications etc. to perform the methods herein when being executed in the network node 105.

The network node 105 may receive information from, e.g., the UE 101, through a second receiving port 604. The second receiving port 604 may be, for example, connected to one or more antennas in network node 105. The network node 105 may receive information from another structure in the communications system 100 through the second receiving port 604. Since the second receiving port 604 may be in communication with the second processor 601, the second receiving port 604 may then send the received information to the second processor 601. The second receiving port 604 may be configured to receive other information.

The second processor 601 in the network node 105 may be configured to transmit or send information to e.g., the UE 101, or another structure in the communications system 100, through a second sending port 605, which may be in communication with the second processor 601, and the second memory 603.

The network node 105 may comprise a providing unit 613 and an obtaining unit 615. The providing unit 613 may also be referred to as a providing module, a providing means, a providing circuit, means for providing etc. The providing unit 613 may be the second processor 601 of the network node 105 or comprised in the second processor 601 of the network node 105.

The obtaining unit 615 may also be referred to as an obtaining module, an obtaining means, an obtaining circuit, means for obtaining etc. The obtaining unit 615 may be the second processor 601 of the network node 105 or comprised in the second processor 601 of the network node 105.

The network node 105 is adapted to, e.g. by means of the providing unit 613, provide a rule to the UE 101 according to which the UE 101 shall perform a GNSS measurement.

The network node 105 may be adapted to, e.g. by means of the providing unit 613, provide, to the UE 101, information indicating geographical cell boundaries defining the NR communications network 100.

The network node 105 may be adapted to, e.g. by means of the providing unit 613, provide a receipt of a handover command to the UE 101.

The network node 105 may be adapted to, e.g. by means of the providing unit 613, provide, to the UE 101, instructions to perform the GNSS measurement.

The network node 105 may be adapted to, e.g. by means of the providing unit 613, provide a timer to the UE 101.

The network node 105 may be adapted to, e.g. by means of the obtaining unit 615, obtain information indicating the GNSS measurement from the UE 101.

The providing unit 613 and the obtaining unit 615 described above may refer to a combination of analog and digital circuits, and/or one or more processors configured with software and/or firmware, e.g., stored in memory, that, when executed by the one or more processors such as the second processor 601, perform as described above. One or more of these processors, as well as the other digital hardware, may be comprised in a single ASIC, or several processors and various digital hardware may be distributed among several separate components, whether individually packaged or assembled into a SoC.

The different units 613-615 described above may be implemented as one or more applications running on one or more processors such as the second processor 601.

Thus, the methods described herein for the network node 105 may be respectively implemented by means of a second computer program 610 product, comprising instructions, i.e. software code portions, which, when executed on at least one second processor 601, cause the at least one second processor 601 to carry out the actions described herein, as performed by the network node 105. The second computer program 610 product may be stored on a second computer-readable storage medium 608. The computer-readable storage medium 608, having stored thereon the second computer program 610, may comprise instructions which, when executed on at least one second processor 601, cause the at least one second processor 601 to carry out the actions described herein, as performed by the network node 105. The computer-readable storage medium 610 may be a non-transitory computer-readable storage medium, such as a CD ROM disc, or a memory stick. The second computer program 610 product may be stored on a carrier comprising the second computer program 610 just described. The carrier is one of an electronic signal, optical signal, radio signal, or the second computer-readable storage medium 608, as described above.

The network node 105 may comprise a communication interface configured to facilitate communications between the network node 105 and other nodes or devices, e.g., the UE 101, or another structure. The interface may, for example, comprise a transceiver configured to transmit and receive radio signals over an air interface in accordance with a suitable standard.

The network node 105 may comprise the following arrangement depicted in FIG. 6b. The network node 105 may comprise a second processing circuitry 611, e.g., one or more processors such as the second processor 601, in the network node 105 and the second memory 603. The network node 105 may comprise a second radio circuitry 613, which may comprise e.g., the second receiving port 604 and the second sending port 605. The second processing circuitry 611 may be configured to, or operable to, perform the method actions according to FIGS. 3 and 4 and/or FIGS. 9-12 in a similar manner as that described in relation to FIG. 6a. The second radio circuitry 613 may be configured to set up and maintain at least a wireless connection with the network node 105. Circuitry may be understood herein as a hardware component.

Hence, the network node 105 is operative to operate in the communications system 100. The network node 105 may comprise the second processing circuitry 613 and the second memory 603. The second memory 603 comprises instructions executable by the second processing circuitry 613. The network node 105 is operative to perform the actions described herein in relation to the network node 105, e.g., in FIGS. 3-4 and/or FIGS. 9-12.

Further Extensions And Variations

A telecommunication network is connected via an intermediate network to a host computer.

Figure 7:
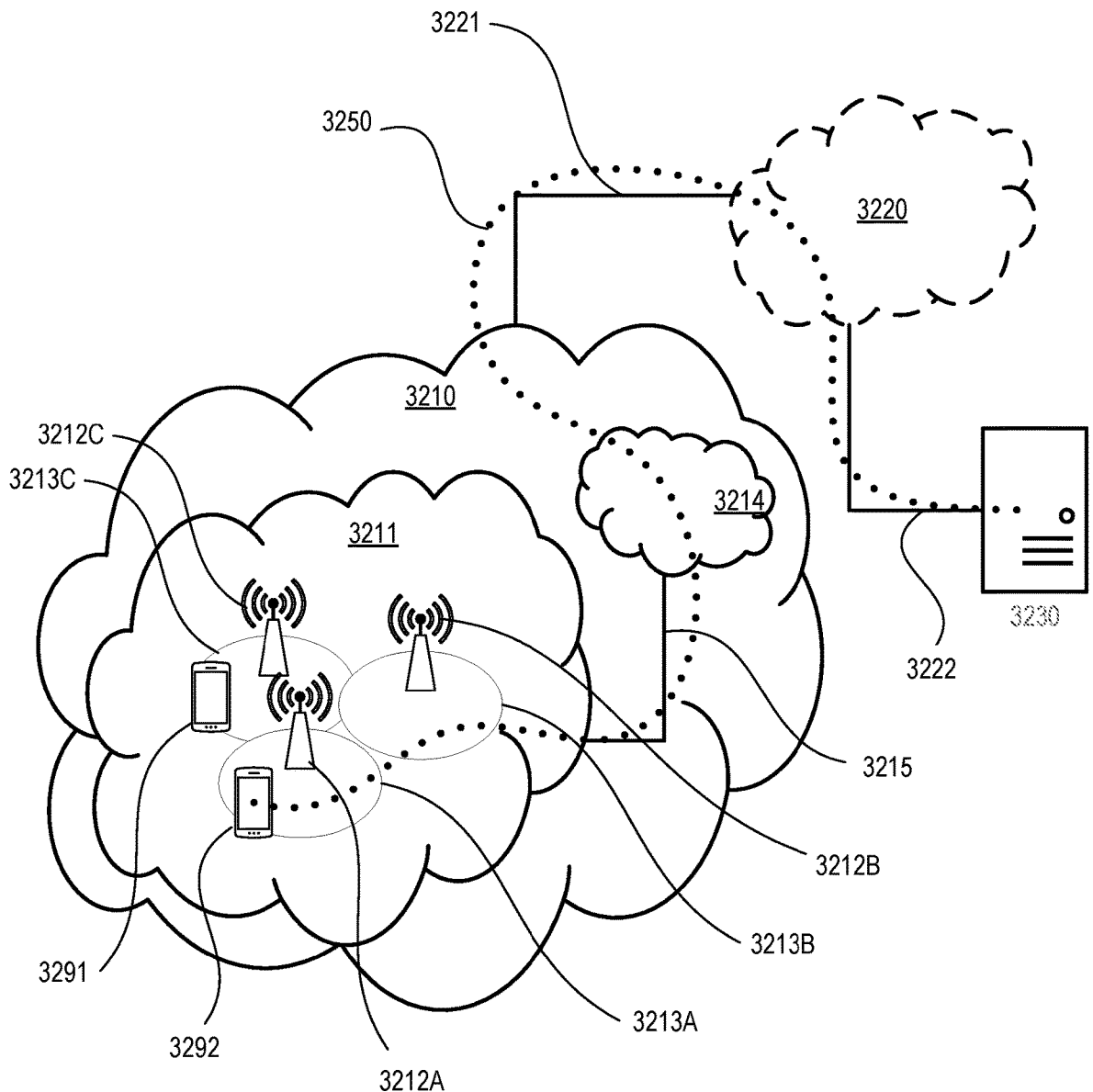
FIG. 7 is a schematic block diagram illustrating a telecommunication network connected via an intermediate network to a host computer.

With reference to FIG. 7, a communication system comprises telecommunication network 3210 such as the communications system 100, for example, a 3GPP-type cellular network, which comprises access network 3211, such as a radio access network, and core network 3214. Access network 3211 comprises a plurality of network nodes 105. For example, base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A plurality of user equipments, such as the UE 101 may be comprised in the communications system 100. In FIG. 7, a first UE 3291 located in coverage area 3213c is configured to wirelessly connect to, or be paged by, the corresponding base station 3212c. A second UE QQ492 in coverage area 3213a is wirelessly connectable to the corresponding base station 3212a. While a plurality of UEs 3291, 3292 are illustrated in FIG. 7, the present disclosure is equally applicable to a situation where a sole UE is in the coverage area or where a sole UE is connecting to the corresponding base station 3212. Any of the UEs 3291, 3292 may be considered examples of the UE 101.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 7 as a whole enables connectivity between the connected UEs 3291, 3292 and host computer 3230. The connectivity may be described as an Over-The-Top (OTT) connection 3250. Host computer 3230 and the connected UEs 3291, 3292 are configured to communicate data and/or signaling via OTT connection 3250, using access network 3211, core network 3214, any intermediate network 3220 and possible infrastructure (not shown) as intermediaries. OTT connection 3250 may be transparent in the sense that the participating communication devices through which OTT connection 3250 passes are unaware of routing of uplink and downlink communications. The base station 3212 may not or need not be informed about the past routing of an incoming downlink communication with data originating from host computer 3230 to be forwarded, e.g., handed over, to a connected UE 3291. Similarly, base station 3212 need not be aware of the future routing of an outgoing uplink communication originating from the UE 3291 towards the host computer 3230.

In relation to FIGS. 9-12 which are described next, it may be understood that the base station may be considered an example of the network node 105.

Figure 8:
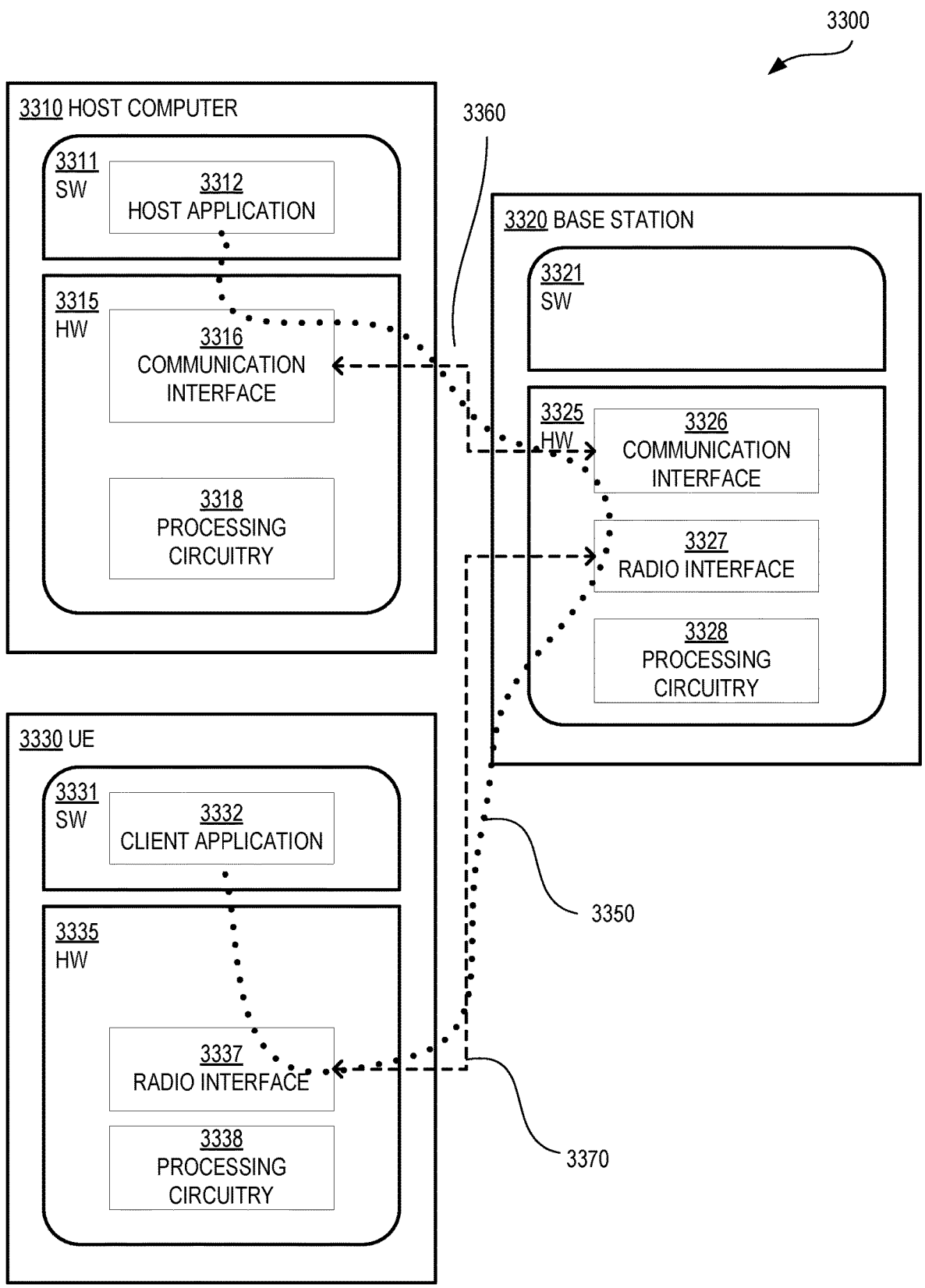
FIG. 8 is a schematic block diagram of a host computer communicating via a base station with a UE over a partially wireless connection.

FIG. 8 illustrates a host computer communicating via a base station 105 with a UE 101 over a partially wireless connection.

The UE 101 and the network node 105, e.g., a base station and host computer discussed in the preceding paragraphs will now be described with reference to FIG. 8. In communication system 3330, such as the communications system 100, host computer 3310 comprises hardware 3315 comprising communication interface 3316 configured to set up and maintain a wired or wireless connection with an interface of a different communication device of communication system 3300. Host computer 3310 comprises processing circuitry 3318, which may have storage and/or processing capabilities. In particular, processing circuitry 3318 may comprise one or more programmable processors, ASIC, field programmable gate arrays or combinations of these (not shown) adapted to execute instructions. Host computer 3310 comprises software 3311, which is stored in or accessible by host computer 3310 and executable by processing circuitry 3318. Software 3311 comprises host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 comprises the network node 105 exemplified in FIG. 8 as a base station 3320 provided in a telecommunication system and comprising hardware 3325 enabling it to communicate with host computer 3310 and with UE 3330. Hardware 3325 may comprise communication interface 3326 for setting up and maintaining a wired or wireless connection with an interface of a different communication device of communication system 3300, as well as radio interface 3327 for setting up and maintaining at least wireless connection 3370 with the UE 101, exemplified in FIG. 8 as a UE 3330 located in a coverage area (not shown in FIG. 8) served by base station 3320. Communication interface 3326 may be configured to facilitate connection 3360 to host computer 3310. Connection 3360 may be direct or it may pass through a core network (not shown in FIG. 8) of the telecommunication system and/or through one or more intermediate networks outside the telecommunication system. In FIG. 8, the hardware 3325 of base station 3320 comprises processing circuitry 3328, which may comprise one or more programmable processors, ASIC, field programmable gate arrays or combinations of these (not shown) adapted to execute instructions. Base station 3320 has software 3321 stored internally or accessible via an external connection.

Communication system 3300 comprises UE 3330 already referred to. It's hardware 3335 may comprise radio interface 3337 configured to set up and maintain wireless connection 3370 with a base station serving a coverage area in which UE 3330 is currently located. Hardware 3335 of UE 3330 comprises processing circuitry 3338, which may comprise one or more programmable processors, ASICs, field programmable gate arrays or combinations of these (not shown) adapted to execute instructions. UE 3330 comprises software 3331, which is stored in or accessible by UE 3330 and executable by processing circuitry 3338. Software 3331 comprises client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 8 may be similar or identical to host computer 3230, one of base stations 3212a, QQ412b, 3212c and one of UEs 3291, 3292 of FIG. 7, respectively. This is to say, the inner workings of these entities may be as shown in FIG. 8 and independently, the surrounding network topology may be that of FIG. 7.

In FIG. 8, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both.

While OTT connection 3350 is active, the network infrastructure may take decisions by which it dynamically changes the routing, e.g., on the basis of load balancing consideration or reconfiguration of the network.

Wireless connection 3370 between UE 3330 and base station 3320 is in accordance with the present disclosure. The performance of OTT services provided to UE 3330 using OTT connection 3350 may be improved, in which wireless connection 3370 forms the last segment. More precisely, the spectrum efficiency and latency may be improved, and thereby provide benefits such as reduced user waiting time, better responsiveness and extended battery lifetime.

A measurement procedure may be provided for the purpose of monitoring data rate, latency and other factors which are improved herein. There may be an optional network functionality for reconfiguring OTT connection 3350 between host computer 3310 and UE 3330, in response to variations in the measurement results. The at least one of the measurement procedure and the network functionality for reconfiguring OTT connection 3350 may be implemented in software 3311 and hardware 3315 of host computer 3310 or in software 3331 and hardware 3335 of UE 3330, or both. Sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may comprise message format, retransmission settings, preferred routing etc. The reconfiguring need not affect base station 3320, and it may be unknown or imperceptible to base station 3320. Such procedures and functionalities may be known and practiced in the art. Measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figures 9, 10:
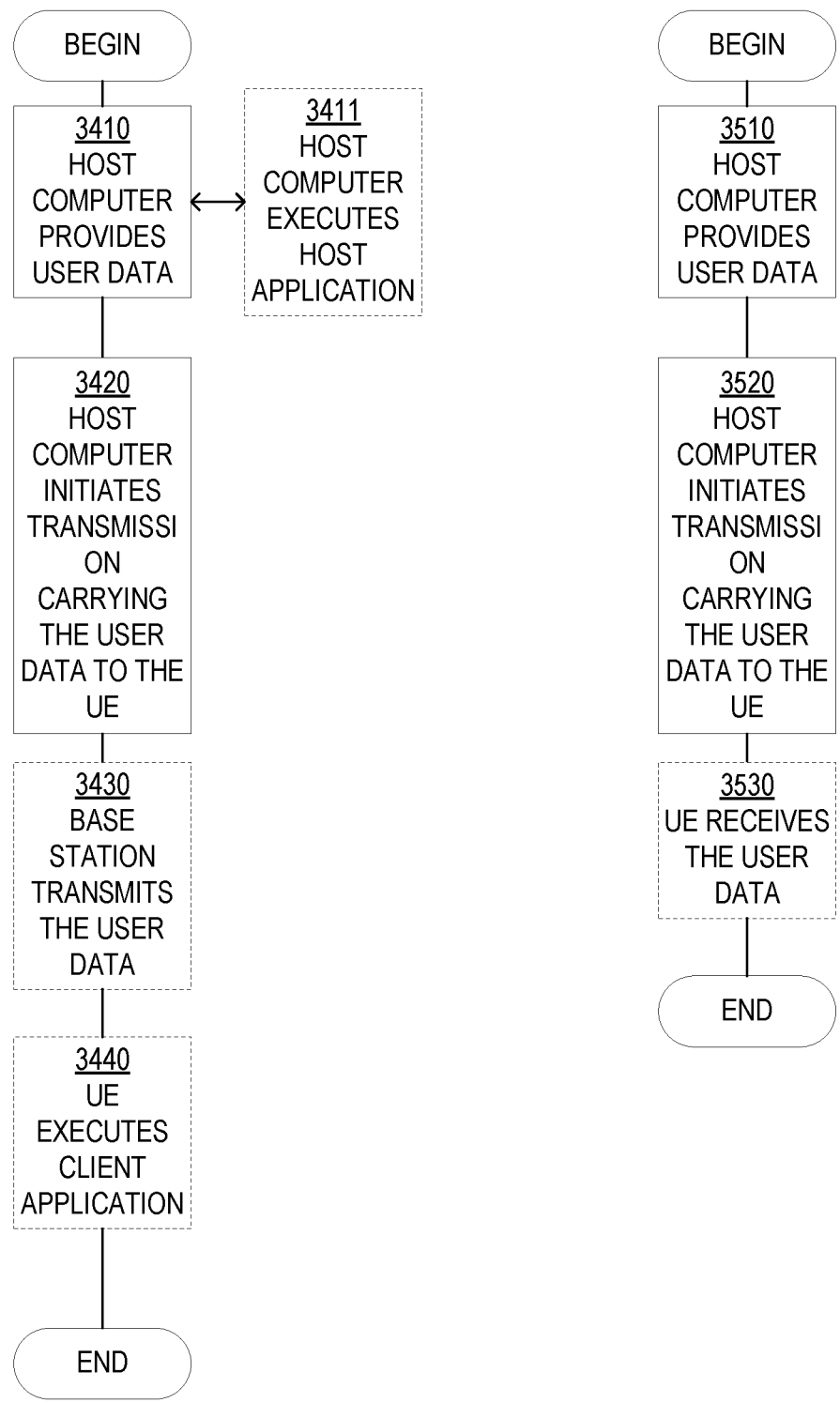
FIG. 9 is a flowchart depicting a method in a communications system comprising a host computer, a base station and a UE.
FIG. 10 is a flowchart depicting a method in a communications system comprising a host computer, a base station and a UE.

FIG. 9 illustrates methods implemented in a communication system comprising a host computer, a base station and a UE 101. FIG. 9 is a flowchart illustrating a method implemented in a communication system. The communication system comprises a host computer, a base station and a UE 101 which may be those described with reference to FIG. 7 and FIG. 8. For simplicity of the present disclosure, only drawing references to FIG. 9 will be comprised in this section. In step 3410, the host computer provides user data. In substep 3411 (which may be optional) of step 3410, the host computer provides the user data by executing a host application. In step 3420, the host computer initiates a transmission carrying the user data to the UE 101. In step 3430 (which may be optional), the base station transmits to the UE 101 the user data which was carried in the transmission that the host computer initiated. In step 3440 (which may also be optional), the UE 101 executes a client application associated with the host application executed by the host computer.

FIG. 10 illustrates methods implemented in a communication system comprising a host computer, a base station and a UE 101. FIG. 10 is a flowchart illustrating a method implemented in a communication system. The communication system comprises a host computer, a base station and a UE 101 which may be those described with reference to FIG. 7 and FIG. 8. For simplicity of the present disclosure, only drawing references to FIG. 19 will be comprised in this section. In step 3510 of the method, the host computer provides user data. In an optional substep (not shown) the host computer provides the user data by executing a host application. In step 3520, the host computer initiates a transmission carrying the user data to the UE 101. The transmission may pass via the base station. In step 3530 (which may be optional), the UE 101 receives the user data carried in the transmission.

Figures 11, 12:
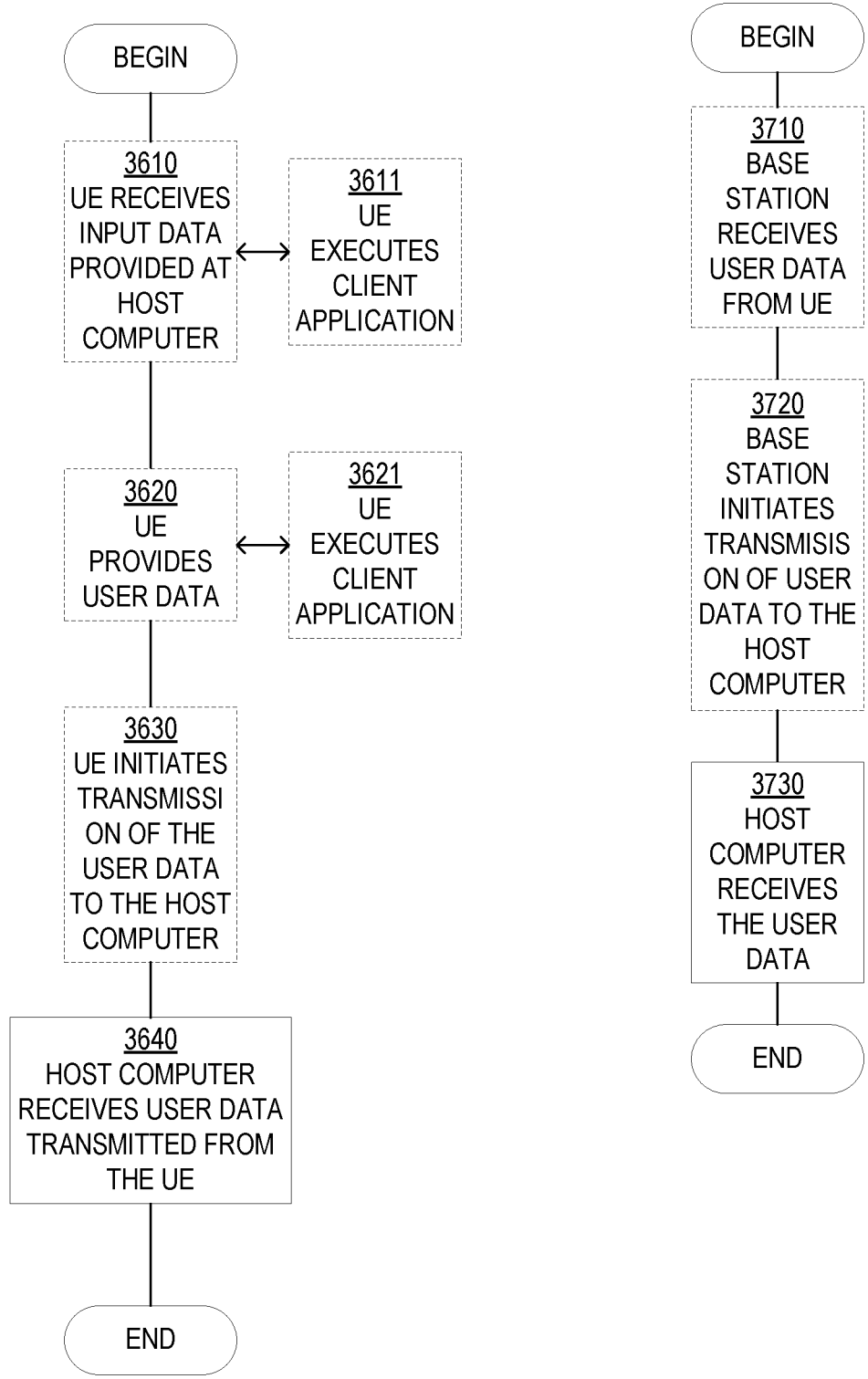
FIG. 11 is a flowchart depicting a method in a communications system comprising a host computer, a base station and a UE.
FIG. 12 is a flowchart depicting a method in a communications system comprising a host computer, a base station and a UE.

FIG. 11 illustrates methods implemented in a communication system comprising a host computer, a base station and a UE 101. FIG. 11 is a flowchart illustrating a method implemented in a communication system. The communication system comprises a host computer, a base station 105 and a UE 101 which may be those described with reference to FIG. 7 and FIG. 8. For simplicity of the present disclosure, only drawing references to FIG. 11 will be comprised in this section. In step 3610 (which may be optional), the UE 101 receives input data provided by the host computer. Additionally or alternatively, in step 3620, the UE 101 provides user data. In substep 3621 (which may be optional) of step 3620, the UE 101 provides the user data by executing a client application. In substep 3611 (which may be optional) of step 3610, the UE 101 executes a client application which provides the user data in reaction to the received input data provided by the host computer. In providing the user data, the executed client application may consider user input received from the user. Regardless of the specific manner in which the user data was provided, the UE 101 initiates, in substep 3630 (which may be optional), transmission of the user data to the host computer. In step 3640 of the method, the host computer receives the user data transmitted from the UE 101.

FIG. 12 illustrates methods implemented in a communication system comprising a host computer, a base station and a UE 101. FIG. 12 is a flowchart illustrating a method implemented in a communication system. The communication system comprises a host computer, a base station and a UE 101 which may be those described with reference to FIG. 7 and FIG. 8. For simplicity of the present disclosure, only drawing references to FIG. 12 will be comprised in this section. In step 3710 (which may be optional), the base station receives user data from the UE 101. In step 3720 (which may be optional), the base station initiates transmission of the received user data to the host computer. In step 3730 (which may be optional), the host computer receives the user data carried in the transmission initiated by the base station.

Some embodiments may be summarized as follows:

A base station configured to communicate with a UE 101, the base station comprising a radio interface and processing circuitry configured to perform one or more of the actions described herein as performed by the network node 105.

A communication system 100 comprising a host computer comprising:
processing circuitry configured to provide user data; and
a communication interface configured to forward the user data to a cellular network for transmission to a UE 101,
the cellular network comprises a base station 105 having a radio interface and processing circuitry, the base station's processing circuitry configured to perform one or more of the actions described herein as performed by the network node 105.

The communication system may comprise the base station 105.

The communication system may comprise the UE 101. The UE 101 is configured to communicate with the base station 105.

The communication system, wherein:
the processing circuitry of the host computer is configured to execute a host application, thereby providing the user data; and
the UE 101 comprises processing circuitry configured to execute a client application associated with the host application.

A method implemented in a base station 105, comprising one or more of the actions described herein as performed by the network node 105.

A method implemented in a communication system 100 comprising a host computer, a base station and a UE 101, the method comprising:
at the host computer, providing user data; and
at the host computer, initiating a transmission carrying the user data to the UE 101 via a cellular network comprising the base station 105. The base station 105 performs one or more of the actions described herein as performed by the network node 105.

The method may comprise:
at the base station 105, transmitting the user data.

The user data may be provided at the host computer by executing a host application, and the method may comprise:
at the UE 101, executing a client application associated with the host application.

A UE 101 configured to communicate with a base station 105, the UE 101 comprising a radio interface and processing circuitry configured to perform one or more of the actions described herein as performed by the UE 101.

A communication system 100 comprising a host computer comprising:
processing circuitry configured to provide user data; and
a communication interface configured to forward user data to a cellular network for transmission to a UE 101,
the UE 101 comprises a radio interface and processing circuitry, the UE's processing circuitry configured to perform one or more of the actions described herein as performed by the UE 101.

The communication system may comprise the UE 101.

The communication system 100, wherein the cellular network comprises a base station 105 configured to communicate with the UE 101.

The communication system 100, wherein:
the processing circuitry of the host computer is configured to execute a host application, thereby providing the user data; and
the UE's processing circuitry is configured to execute a client application associated with the host application.

A method implemented in a UE 101, comprising one or more of the actions described herein as performed by the UE 101.

A method implemented in a communication system 100 comprising a host computer, a base station 105 and a UE 101, the method comprising:
at the host computer, providing user data; and
at the host computer, initiating a transmission carrying the user data to the UE 101 via a cellular network comprising the base station. The UE 101 performs one or more of the actions described herein as performed by the UE 101.

The method may comprise:
at the UE 101, receiving the user data from the base station 105.

A UE 101 configured to communicate with a base station 105, the UE 101 comprising a radio interface and processing circuitry configured to perform one or more of the actions described herein as performed by the UE 101.

A communication system 100 comprising a host computer comprising:
a communication interface configured to receive user data originating from a transmission from a UE 101 to a base station 105,
the UE 101 comprises a radio interface and processing circuitry, the UE's processing circuitry configured to perform one or more of the actions described herein as performed by the UE 101.

The communication system 100 may comprise the UE 101.

The communication system 100 may comprise the base station 105. The base station 105 comprises a radio interface configured to communicate with the UE 101 and a communication interface configured to forward to the host computer the user data carried by a transmission from the UE 101 to the base station.

The communication system 100, wherein:
the processing circuitry of the host computer is configured to execute a host application; and
the UE's processing circuitry is configured to execute a client application associated with the host application, thereby providing the user data.

The communication system 100, wherein:
the processing circuitry of the host computer is configured to execute a host application, thereby providing request data; and
the UE's processing circuitry is configured to execute a client application associated with the host application, thereby providing the user data in response to the request data.

A method implemented in a UE 101, comprising one or more of the actions described herein as performed by the UE 101.

The method may comprise:
providing user data; and
forwarding the user data to a host computer via the transmission to the base station 105.

A method implemented in a communication system 100 comprising a host computer, a base station 105 and a UE 101, the method comprising:
at the host computer, receiving user data transmitted to the base station 105 from the UE 101. The UE 101 performs one or more of the actions described herein as performed by the UE 101.

The method may comprise:
at the UE 101, providing the user data to the base station 105.

The method may comprise:
at the UE 101, executing a client application, thereby providing the user data to be transmitted; and
at the host computer, executing a host application associated with the client application.

The method may comprise:
at the UE 101, executing a client application; and
at the UE 101, receiving input data to the client application, the input data being provided at the host computer by executing a host application associated with the client application,
the user data to be transmitted is provided by the client application in response to the input data.

A base station 105 configured to communicate with a UE 101, the base station 105 comprising a radio interface and processing circuitry configured to perform one or more of the actions described herein as performed by the network node 105.

A communication system 100 comprising a host computer comprising a communication interface configured to receive user data originating from a transmission from a UE 101 to a base station. The base station 105 comprises a radio interface and processing circuitry, the base station's processing circuitry configured to perform one or more of the actions described herein as performed by the network node 105.

The communication system 100 may comprise the base station 105.

The communication system 100 may comprise the UE 101. The UE 101 is configured to communicate with the base station 105.

The communication system 100 wherein:
the processing circuitry of the host computer is configured to execute a host application;
the UE 101 is configured to execute a client application associated with the host application, thereby providing the user data to be received by the host computer.

A method implemented in a base station 105, comprising one or more of the actions described herein as performed by any of the network node 105.

A method implemented in a communication system comprising a host computer, a base station 105 and a UE 101, the method comprising:
at the host computer, receiving, from the base station 105, user data originating from a transmission which the base station has received from the UE 101. The UE 101 performs one or more of the actions described herein as performed by the UE 101.

The method may comprise:
at the base station 105, receiving the user data from the UE 101.

The method may comprise:
at the base station 105, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step.

In general, the usage of "first", "second", "third", "fourth", and/or "fifth" herein may be understood to be an arbitrary way to denote different elements or entities, and may be understood to not confer a cumulative or chronological character to the nouns they modify, unless otherwise noted, based on context.

The present disclosure is not limited to the above description. Various alternatives, modifications and equivalents may be used. Therefore, the above description should not be taken as limiting the scope. A feature may be combined with one or more features.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods may, without departing from the present disclosure, be performed in another order than the order in which they appear herein.

The invention claimed is:

1. A User Equipment, UE, for enabling Global Navigation Satellite System, GNSS, measurements, the UE and a network node being comprised in a New Radio, NR, communications network, and the NR communications network comprising a Non-Terrestrial Network, NTN, component, the UE being configured to:
perform a GNSS measurement according to a rule and using a GNSS receiver comprised in the UE, wherein at least one of a UE position and an absolute time is an output of the GNSS measurement or is derivable from the GNSS measurement, the rule being that the GNSS measurement is performed with a periodicity associated with at least one of:
a Discontinuous Reception, DRX, cycle;
an enhanced Discontinuous Reception, eDRX, cycle; and/or
a Tracking Area Update, TAU, timer; and
a Radio Access Network based Notification Area Update, RNAU, timer, the rule being that the GNSS measurement is performed with a periodicity when the UE is in idle mode.

2. The UE according to claim 1, wherein the UE is adapted configured to:
obtain, from the network node, information indicating geographical cell boundaries defining the NR communications network;
determine the UE's distance d to an edge of the currently camped on cell;
determine, based on the distance d and the UE's velocity v, a time t until a next occasion for performing the GNSS measurement: and
wherein the rule is that the GNSS measurement is performed at the determined time.

3. The UE according to claim 1, wherein the rule is that the GNSS measurement is performed when triggered by an event.

4. The UE according to claim 3, wherein the event is at least one of:
that a UE selects a new cell that does not belong to at least one tracking area to which the UE is registered;
that the UE selects a new cell that does not belong to the configured Radio Access Network, RAN,-based Notification Area, RNA;
receipt of a handover command from the network node;
that a conditional handover triggering condition is fulfilled; that a beam failure recovery procedure is triggered; and
that a new cell that does not belong to any of a current timing advance groups is activated.

5. A method performed by a User Equipment, UE, for enabling Global Navigation Satellite System, GNSS, measurements, the UE and a network node being comprised in a New Radio, NR, communications network, and the NR communications network comprises a Non-Terrestrial Network, NTN, component, the method comprising:
performing a GNSS measurement according to a rule and using a GNSS receiver comprised in the UE, at least one of a UE position and an absolute time being one of an output of the GNSS measurement and derivable from the GNSS measurement, the rule being that the GNSS measurement is performed with a periodicity associated with at least one of:
a Discontinuous Reception, DRX, cycle;
an enhanced Discontinuous Reception, eDRX, cycle;
a Tracking Area Update, TAU, timer; and
a Radio Access Network based Notification Area Update, RNAU, timer,
the rule being that the GNSS measurement is performed with a periodicity when the UE is in idle mode.

6. The method according to claim 5, wherein the method further comprises:
obtaining, from the network node, information indicating geographical cell boundaries defining the NR communications network;
determining the UE's distance d to an edge of the currently camped on cell;
determining, based on the distance d and the UE's velocity v, a time t until a next occasion for performing the GNSS measurement: and
wherein the rule is that the GNSS measurement is performed at the determined time.

7. The method according to claim 5, wherein the rule is that the GNSS measurement is performed when triggered by an event.

8. The method according to claim 7, wherein the event is at least one of:
that the UE selects a new cell that does not belong to at least one tracking area to which the UE is registered;
that the UE selects a new cell that does not belong to the configured Radio Access Network, RAN, based Notification Area, RNA;
receipt of a handover command from the network node;
that a conditional handover triggering condition is fulfilled;
that a beam failure recovery procedure is triggered; and
that a new cell that does not belong to any of a current timing advance groups is activated.

9. A non-transitory computer storage medium storing a computer program comprising instructions which, when executed on at least one processor, cause the at least one processor to:
perform a Global Navigation Satellite System, GNSS, measurement according to a rule and using a GNSS receiver comprised in a User Equipment, UE, at least one of a UE position and an absolute time being one of an output of the GNSS measurement and derivable from the GNSS measurement, the rule being that the GNSS measurement is performed with a periodicity associated with at least one of:
a Discontinuous Reception, DRX, cycle;
an enhanced Discontinuous Reception, eDRX, cycle;
a Tracking Area Update, TAU, timer; and
a Radio Access Network based Notification Area Update, RNAU, timer,
the rule being that the GNSS measurement is performed with a periodicity when the UE is in idle mode.

* * * * *